(12) United States Patent
Yasukawa et al.

(10) Patent No.: US 8,526,029 B2
(45) Date of Patent: Sep. 3, 2013

(54) IMAGE FORMING APPARATUS PROVIDING CONFIGURABLE OPTIONS FOR PAPER INFORMATION INITIALIZATION, IMAGE FORMING SYSTEM AND COMPUTER READABLE MEDIUM

(75) Inventors: Kiyoshi Yasukawa, Kanagawa (JP); Yuji Onozawa, Kanagawa (JP); Yuji Nakane, Kanagawa (JP); Kazutoshi Kondo, Kanagawa (JP); Akira Shinada, Kanagawa (JP); Takashi Katou, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 166 days.

(21) Appl. No.: 13/018,495

(22) Filed: Feb. 1, 2011

(65) Prior Publication Data
US 2012/0075656 A1 Mar. 29, 2012

(30) Foreign Application Priority Data
Sep. 27, 2010 (JP) .................................. 2010-214932

(51) Int. Cl.
*G06K 15/02* (2006.01)
(52) U.S. Cl.
USPC .................. 358/1.14; 358/1.15; 358/1.13
(58) Field of Classification Search
USPC ............................................... 358/1.15, 1.14
See application file for complete search history.

(56) References Cited

U.S. PATENT DOCUMENTS
2008/0180711 A1* 7/2008 Ebuchi ......................... 358/1.12

FOREIGN PATENT DOCUMENTS
| JP | 11-115280 A | | 4/1999 |
| JP | 11115280 A | * | 4/1999 |
| JP | 2002-019212 A | | 1/2002 |
| JP | 2005-085021 A | | 3/2005 |

* cited by examiner

*Primary Examiner* — King Poon
*Assistant Examiner* — Andrew H Lam
(74) *Attorney, Agent, or Firm* — Sughrue Mion, PLLC

(57) ABSTRACT

An image forming apparatus includes a receiving unit, a paper information storing unit, an initializing unit, a paper information comparing unit, a temporary stopping unit, and a printing unit. The receiving unit receives print jobs. The paper information storing unit stores paper information preset in the printed page. The initializing unit initializes the paper information stored in the paper information storing unit during a certain period. The paper information comparing unit compares the paper information of the page to be printed in the print job with the stored paper information. The temporary stopping unit temporarily stops printing according to the result of the comparison. The printing unit prints the print data of the page to be printed in the case that the paper information of the page to be printed is the same as the stored paper information or the stored paper information has been initialized.

12 Claims, 14 Drawing Sheets

FUNCTION BLOCK DIAGRAM OF CONTROLLER

FIG. 8  INITIALIZATION OF PAPER INFORMATION "BEFORE START OF PRINTING OF PRINT JOBS STORED IN QUEUE BEGINNING WITH 0"

IMAGE FORMING APPARATUS PROVIDING CONFIGURABLE OPTIONS FOR PAPER INFORMATION INITIALIZATION, IMAGE FORMING SYSTEM AND COMPUTER READABLE MEDIUM

CROSS-REFERENCE TO RELATED APPLICATIONS

This application is based upon and claims priority under 35 USC 119 from Japanese Patent Application No. 2010-214932, filed on Sep. 27, 2010.

BACKGROUND

1. Technical Field

The present invention relates to an image forming apparatus, an image forming system and a computer readable medium.

2. Related Art

Conventionally, there exists an image forming apparatus incapable of detecting the size of paper stored in a paper feed tray.

This type of image forming apparatus is advantageous in cost since it is not equipped with a paper size detection mechanism.

In this type of image forming apparatus not equipped with a paper size detection mechanism, in the case that the paper size of the paper preset in print data is different from the paper size of the paper actually stored in the paper feed tray, the printing is carried out on different size paper.

Hence, in this type of image forming apparatus not equipped with a paper size detection mechanism, in the case that the paper size preset in the print data of the printing completed normally and stored as "the paper size of the page printed immediately before" is compared with "the paper size of the page printed immediately before" stored as the paper size preset in the print data of the next page before the printing of the next page and that there is a difference therebetween, a technology is available in which the printing is temporarily stopped and the user is prompted to carry out paper replacement.

In the case that the user is prompted to carry out paper replacement, a technology is available in which a message prompting the paper replacement is displayed on an operation panel, the user carries out the paper replacement and inputs a print restart instruction through the operation panel, and the image forming apparatus judges that the paper replacement is completed.

SUMMARY OF THE INVENTION

According to an aspect of the invention, an image forming apparatus includes a receiving unit, a paper information storing unit, an initializing unit, a paper information comparing unit, a temporary stopping unit, and a printing unit. The receiving unit receives print jobs. The paper information storing unit, when the received print jobs are executed according to a given order and each time one page of a document in a print job having reached its turn in the order of printing is printed, stores paper information preset in the printed page. The initializing unit initializes the paper information stored in the paper information storing unit during the period between the printing of the print job having reached its turn in the given order and the printing of the next print job after the print job in the given order. The paper information comparing unit compares the paper information of the page to be printed in the print job having reached its turn in the order of printing with the paper information stored in the paper information storing unit. The temporary stopping unit temporarily stops printing in the case that the paper information of the page to be printed is different from the paper information stored in the paper information storing unit as the result of the comparison. The printing unit prints the print data of the page to be printed in the case that the paper information of the page to be printed is the same as the paper information stored in the paper information storing unit as the result of the comparison or the paper information stored in the paper information storing unit has been initialized.

BRIEF DESCRIPTION OF THE DRAWINGS

Exemplary embodiments of the invention will be described in detail based on the following figures, wherein:

FIG. 10 is a flowchart showing processing carried out by a printing apparatus 20a;

DETAILED DESCRIPTION

Exemplary embodiments according to the present invention will be described below in detail referring to the accompanying drawings.

Exemplary Embodiment 1

First, a printing system 1 according to the present invention will be described referring to FIG. 1.

Figure 1:
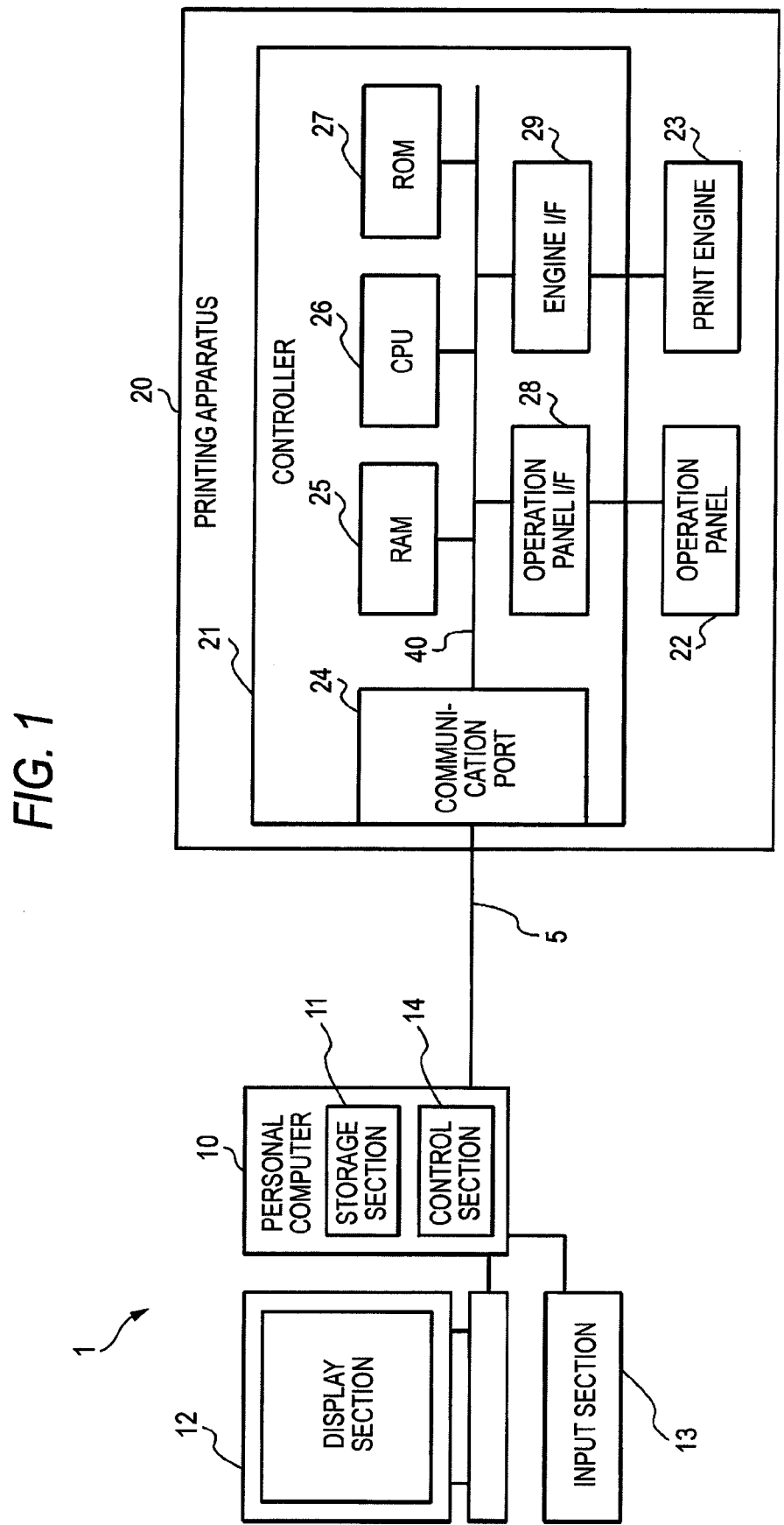
FIG. 1 is a view showing a configuration of a printing system 1.

FIG. 1 is a view showing a configuration of the printing system 1.

The printing system 1 is formed of a personal computer 10 and a printing apparatus 20 connected to each other via a communication line 5 so as to be communicatable therebetween.

The printing apparatus 20 is a simple printing apparatus not equipped with a paper size detection function for detecting the size of paper stored in a paper feed tray.

The communication line 5 may be a local connection, such as a USB (universal serial bus) connection, or a network connection, such as a LAN (local area network), regardless of wired or wireless connection.

The personal computer 10 (hereafter abbreviated as "PC 10" in both the descriptions and drawings) is a host computer for generating print jobs and transmitting the print jobs to the printing apparatus 20.

The PC 10 is equipped with a control section 14 formed of a CPU (central processing unit); a storage section 11 formed of an HDD (hard disk drive), a RAM (random access memory), a ROM (read-only memory), etc.; a display section 12 formed of a liquid crystal display; and an input section 13 formed of a keyboard and a mouse.

The printer driver of the printing apparatus 20 is stored in the storage section 11, and print jobs printed by the printing apparatus 20 are generated under the control of the control section 14.

The printing apparatus 20 is equipped with a controller 21, an operation panel 22 and a print engine 23.

Furthermore, the controller 21 is equipped with a communication port 24, a RAM 25, a CPU 26, a ROM 27, an operation panel interface (hereafter abbreviated as "operation panel I/F" in both the descriptions and drawings) 28 and an engine interface (hereafter abbreviated as "engine I/F" in both the descriptions and drawings) 29. These are connected so as to be mutually communicatable via a bus 40.

The communication port 24 is connected to the communication line 5 and receives print jobs transmitted from the PC 10.

The RAM 25, a rewritable volatile memory, temporarily stores system variables, the paper information of printed pages, print jobs received, etc. so that an image forming program stored in the ROM 27 is executed.

The paper information has the meaning of a paper size, such as A4, A5 and B4.

The paper information of a printed page has the meaning of the paper size of the page on which an image is formed.

The paper information of a page to be printed has the meaning of the paper size of paper to be printed which is set in the image data of the page.

In other words, the paper information is used to have the same meaning of paper size.

However, paper information A has the meaning of "the paper size of the page printed immediately before" and paper information B has the meaning of "the paper size of the page to be printed next."

The meanings of these pieces of paper information are applicable to other exemplary embodiments.

The RAM 25 stores, at its specific storage area, the paper information of the page printed (i.e., subjected to image formation) immediately before (last time) by storing a number corresponding to the paper information.

For example, the RAM 25 stores number "1" in the case that the paper information is A4 and stores number "2" in the case that the paper information is A5.

Moreover, the RAM 25 stores number "0" in the case that the paper information is indefinite.

The state in which the RAM 25 stores number "0" as the paper information is also referred to as "the state in which the paper information of the RAM 25 is initialized."

In the state in which the paper information of the RAM 25 is initialized, the indefinite information "0" is stored as the paper information A in the RAM 25.

Then, the CPU 26 loads the image forming program stored in the ROM 27 into the RAM 25 and centrally controls the printing apparatus 20. In addition, the CPU 26 controls printing processing on the basis of the paper information stored in the RAM 25.

The ROM 27, a nonvolatile memory, stores the image forming program for operating the printing apparatus 20, fixed data, such as the manufacturer's serial number of the printing apparatus, etc.

The operation panel I/F 28 is an interface for communicating with the operation panel 22.

The engine I/F 29 is an interface for communicating with the print engine 23.

The operation panel 22, serving as an interface for communicating with the user who operates the printing apparatus 20, receives instructions from the user and displays information for the user.

The print engine 23 has a function of printing the image data of a print job received by the printing apparatus 20 on paper and includes a paper feed tray, a paper conveying mechanism, a photosensitive unit, an exposure unit, a fixing unit, etc.

The paper feed tray of the printing apparatus 20 included in the print engine 23 does not have a paper size detection function for detecting the paper size of the paper stored therein and does not have a paper presence confirmation function for confirming the presence of the paper stored therein.

Since the printing apparatus 20 configured as described above does not have the paper detection function, each time image data is printed normally on paper, the paper size of the printed paper is stored in the RAM 25 as "the paper information of the page printed immediately before (the paper information A). Then, when image data is printed next, the printing apparatus 20 obtains the paper information (paper size) of the page to be printed from print data and compares the obtained paper information (paper size) of the page to be printed with the paper information (paper size), stored in the RAM 25, of the page printed immediately before.

The paper size of the page printed immediately before is referred to as paper information A, and the paper size of the page to be printed next is referred to as paper information B.

In the case that there is difference in paper information (in the case that the paper information A is different from the paper information B) as the result of the comparison, this means that the paper size of the page printed immediately before is different from the paper size of the page to be printed next. Hence, the printing apparatus 20 temporarily stops printing and displays a message prompting the user to carry out paper replacement on the operation panel 22 to prompt the user to carry out paper replacement.

Furthermore, the printing apparatus 20 initializes "the paper information of the page printed immediately before" stored in the RAM 25 at various timings (the RAM 25 stores number "0" in this case).

Hence (since the paper information is initialized), in the printing apparatus 20, when a print instruction for printing a print job in which a paper size different from the paper size of the page printed immediately before is set is issued, even if work (paper replacing work) in which the paper used for the print job done immediately before is removed from the paper feed tray and then replaced with the paper to be printed in the print job to be instructed so as to be printed next is carried out before the print instruction is issued and then the print instruction for starting the printing of the new print job is issued from the PC 10, the above-mentioned "the temporary stop of the printing to prompt the user to carry out paper replacement on the basis of the comparison with respect to the paper information" does not occur.

The expression "the paper information stored in the RAM 25 is initialized" means that the paper information A stored in the RAM 25 is initialized.

Next, the function of the controller 21 will be described referring to FIG. 2.

Figure 2:
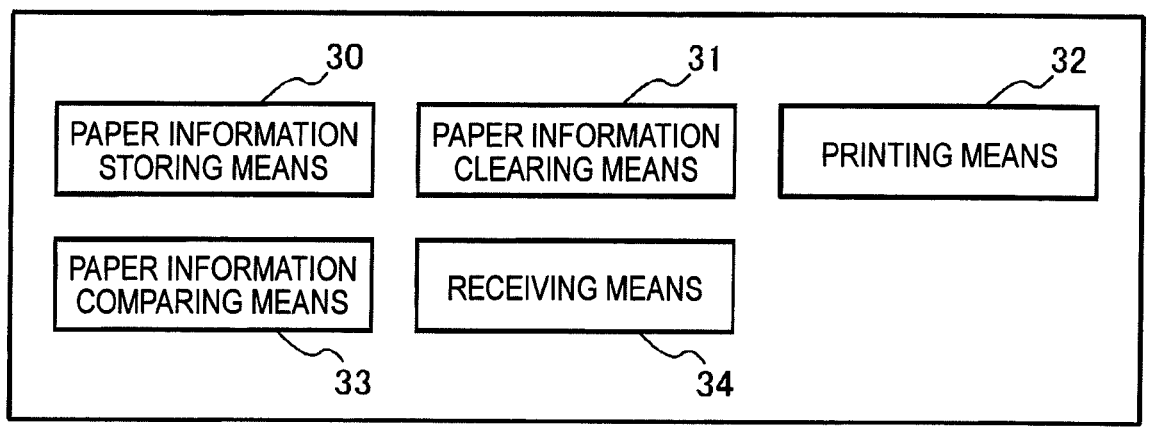
FIG. 2 is a function block diagram of a controller 21.

FIG. 2 is a function block diagram of the controller 21.

The controller 21 has a paper information storing means 30, a paper information clearing means 31, a printing means 32, a paper information comparing means 33 and a receiving means 34 as means for carrying out its functions as shown in FIG. 2.

When print data is printed normally, the paper information storing means 30 stores the paper size of the page printed immediately before as the paper information A in the RAM 25.

The paper information A stored in the paper information storing means 30 is updated each time the page of the image data is printed. In other words, after the image data is printed on paper, the paper information storing means 30 stores the paper size of the paper as the paper information A.

The paper information clearing means 31 initializes the paper information stored using the paper information storing means 30. More specifically, the paper information clearing means 31 stores number "0" instead of a number (for example, "1" in the case of A4) corresponding to a specific paper size at a location of the RAM 25 in which "the paper information of the page printed immediately before" is stored.

The printing means 32 generates image data on the basis of the page-description language for a print job received and prints the image data using the print engine 23.

Under the control of the CPU 26, the paper information comparing means 33 carries out the function of comparing "the paper information of the page printed immediately before (the paper information A)" stored using the paper information storing means 30 with "the paper information of the page to be printed next (the paper information B)" to judge coincidence therebetween.

The receiving means 34 carries out the function of receiving the print data transmitted from the PC 10 at the communication port 24.

In the printing apparatus 20, print jobs are basically printed in the order in which they are received by the receiving means 34. However, in the case that the order of printing is set by various applications capable of setting the order of printing, the printing is carried out according to the order of printing set thereby.

Next, in the printing apparatus 20, the setting of the timing at which "the paper information of the page printed immediately before" stored using the paper information storing means 30 is automatically initialized will be described below referring to FIG. 3.

Figure 3:
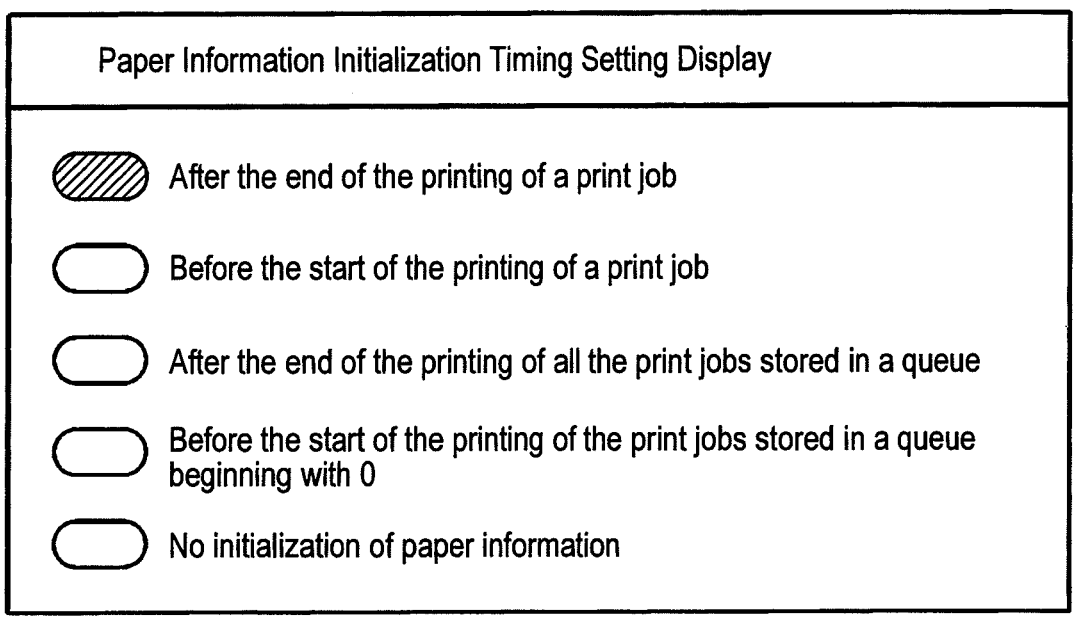
FIG. 3 is a view showing a configuration of a paper information initialization timing setting display 301.

FIG. 3 is a view showing a configuration of a paper information initialization timing setting display 301 shown on the operation panel 22 through which "the selection of timing at which paper information is automatically initialized or the selection of a mode in which the paper information is not automatically initialized" is carried out.

The timing at which "the paper information of the page printed immediately before" stored using the paper information storing means 30 is automatically initialized may be set at "after the end of the printing of a print job" or "before the start of the printing of a print job" or "after the end of the printing of all the print jobs stored in a queue" or "before the start of the printing of the print jobs stored in a queue beginning with 0" as shown in FIG. 3.

In addition, in the printing apparatus 20, it may also be possible to carry out setting so that "the paper information of the page printed immediately before" is not automatically initialized as shown in FIG. 3.

In the printing apparatus 20, the selection of the above-mentioned four timings at which the paper information is automatically initialized or the selection of the mode in which the paper information is not automatically initialized is carried out by the operation of a DIP switch, not shown, provided in the printing apparatus 20 or by the operation on the paper information initialization timing setting display 301 of the operation panel 22, and the content of the selection is set.

When the power of the printing apparatus 20 is turned from off to on, the printing apparatus 20 operates according to the content of the setting of the DIP switch of the printing apparatus 20.

Furthermore, when "the timing at which paper information is automatically initialized" or "the mode in which the paper information is not automatically initialized" is selected through the paper information initialization timing setting display 301 of the operation panel 22 while the power of the printing apparatus 20 is turned on, the content of the selection is set, and processing is carried out according to the content of the setting in the printing apparatus 20.

In other words, in the case that the timing at which paper information is automatically initialized is selected as "after the end of the printing of a print job" through the DIP switch or the paper information initialization timing setting display 301, "the paper information of the page printed immediately before" stored in the RAM 25 using the paper information storing means 30 is initialized in the printing apparatus 20 each time the printing of a print job is completed in the printing apparatus 20.

Furthermore, in the case that the timing at which paper information is automatically initialized is selected as "before the start of the printing of a print job" through the DIP switch or the paper information initialization timing setting display 301, "the paper information of the page printed immediately before" stored in the RAM 25 using the paper information storing means 30 is initialized in the printing apparatus 20 before the start of the printing of the print job received using the receiving means 34 of the printing apparatus 20.

Moreover, in the case that the timing at which paper information is automatically initialized is selected as "after the end of the printing of all the print jobs stored in a queue" through the DIP switch or the paper information initialization timing setting display 301, "the paper information of the page printed immediately before" stored in the RAM 25 using the paper information storing means 30 is initialized in the printing apparatus 20 after all the print jobs received using the receiving means 34 of the printing apparatus 20 and stored in the queue are printed using the printing means 32 and no print jobs remain stored in the queue.

What is more, in the case that the timing at which paper information is automatically initialized is selected as "before the start of the printing of the print jobs stored in a queue beginning with 0" through the DIP switch or the paper information initialization timing setting display 301, "the paper information of the page printed immediately before" stored in the RAM 25 using the paper information storing means 30 is initialized in the printing apparatus 20 in a state in which no print jobs are stored in the queue and before a print job first received using the receiving means 34 is registered in the queue and the printing is started.

Still further, in the case that the mode in which the paper information is not automatically initialized is selected through the DIP switch or the paper information initialization timing setting display 301, "the paper information of the page printed immediately before" stored in the RAM 25 using the paper information storing means 30 is not automatically initialized in the printing apparatus 20.

The content of the selection on the paper information initialization timing setting display 301 is applied between print jobs but not applied while a print job is being done.

Since it is possible in the printing apparatus 20 to carry out the setting of the timing at which paper information is automatically initialized and the setting in which the paper information is not automatically initialized, the setting corresponding to the pattern desired by the user may be made.

In other words, in the case that the user issues a print instruction in which the paper information of the page printed immediately before is different from the paper information of the first page of the print job to be instructed so as to be printed next, when the print instruction is issued in a state in which a setting is made in the printing apparatus 20 so that the paper information is automatically initialized and after the paper is replaced with the paper to be used at the first page in the print job to be instructed so as to be printed next, the printing is not stopped temporarily and the user is not prompted to carry out paper replacement since the paper information has been initialized even in the case that the paper information of the page printed immediately before is different from the paper information of the first page of the print job to be instructed so as to be printed next.

Furthermore, in the case that the user issues a print instruction in which the paper information of the page printed immediately before is different from the paper information of the first page of the print job to be instructed so as to be printed next, when the printing of the next print job is instructed in a state in which a setting is made so that the paper information is not automatically initialized, the printing is stopped temporarily and the user is prompted to carry out paper replacement in the printing apparatus 20 after the print instruction is issued and before the first page of the print job is printed.

Next, the processing of the printing apparatus 20 in the case that the timing at which the paper information is automatically initialized is set at "after the end of the printing of a print job" will be described below referring to FIG. 4.

Figure 4:
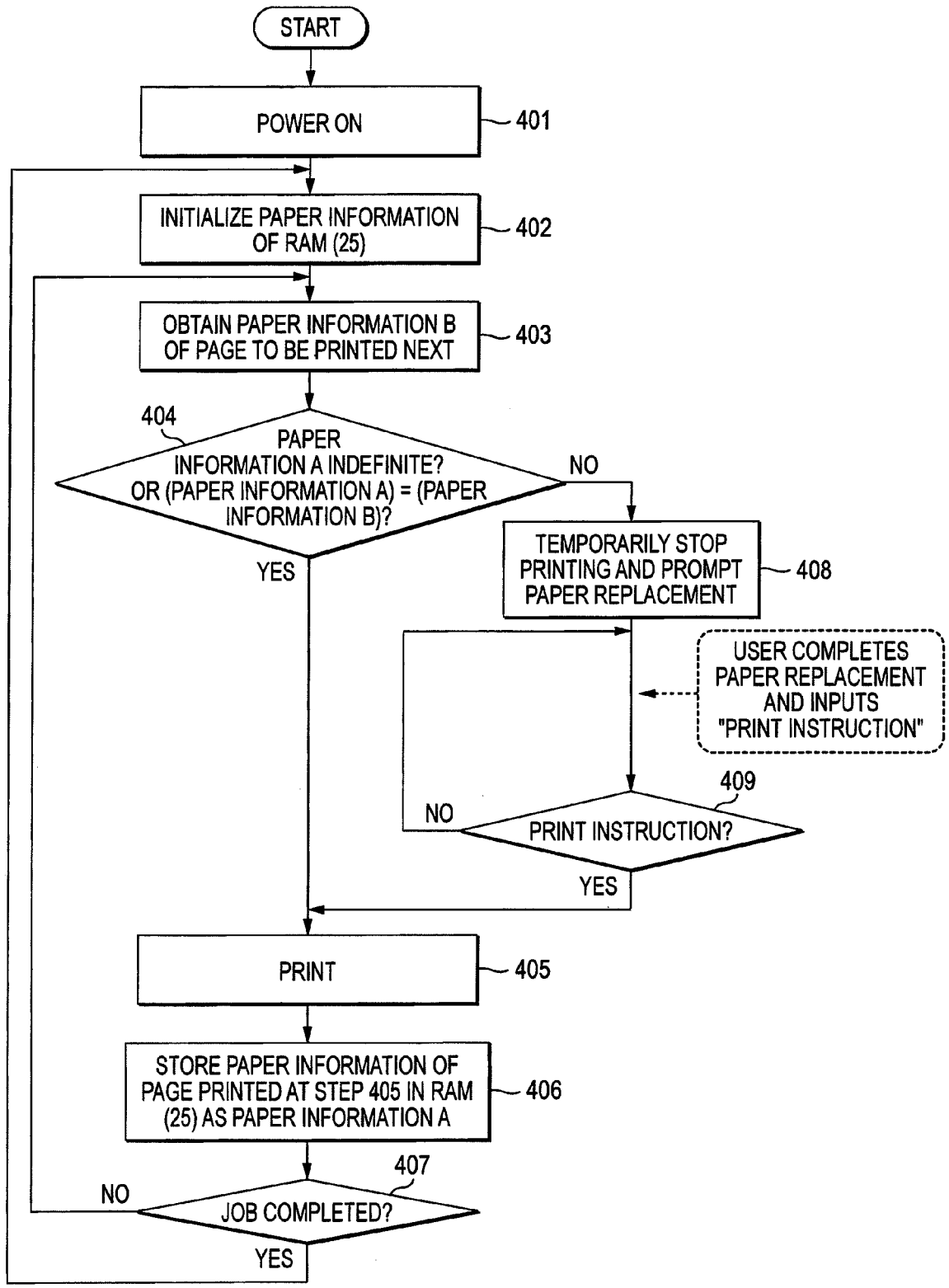
FIG. 4 is a flowchart in the case that paper information is initialized "after the end of the printing of a print job"

FIG. 4 is a flowchart showing the processing carried out by the printing apparatus 20 in the case that the timing at which the paper information is automatically initialized is set at "after the end of the printing of a print job."

The content described referring to FIG. 4 corresponds to the case in which "the timing at which the paper information is automatically initialized" is set through the DIP switch. However, in the case that "the timing at which the paper information is automatically initialized" is set at "after the end of the printing of a print job" on the paper information initialization timing setting display 301 while the power of the printing apparatus 20 is turned on, the processing starts in the middle of the flowchart shown in FIG. 4 as described later in detail.

When the power of the printing apparatus 20 is turned from off to on (at step 401), the paper information of the RAM 25 of the printing apparatus 20 is initialized (at step 402).

In the printing apparatus 20, the receiving means 34 receives a print job, and the printing means 32 generates image data by analyzing the print job.

When the page of the image data to be printed using the printing means 32 is determined, the CPU 26 obtains the paper information of the page P2 to be printed next (the paper information B) using the paper information comparing means 33 (at step 403).

In addition, the CPU 26 uses the paper information comparing means 33 to obtain "the paper information of the page P1 printed immediately before" (hereafter, the paper information is referred to as paper information A) to be stored in the RAM 25 using the paper information storing means 30.

Then, the CPU 26 uses the paper information comparing means 33 to compare the paper information B (the paper information of the page P2 to be printed next) with the paper information A (the paper information of the page P1 printed immediately before) to judge coincidence therebetween (at step 404).

In the case that "the paper information A is initialized" or "the content of the paper information A is the same as the content of the paper information B" as the result of the comparison between the paper information A and the paper information B obtained by the CPU 26 (YES at step 404), the printing of the page P2 is carried out (at step 405).

Then, when the printing of one page of the image data is completed successfully at step 405, the paper information of the printed page, i.e., the paper information (the paper information B) compared in advance using the paper information comparing means 33, is stored in the RAM 25 as "the paper information of the page printed immediately before" using the paper information storing means 30 (at step 406). In other words, when the printing of one page is completed successfully (at step 405), the content of the paper information B compared at step 404 is stored in the RAM 25 as the content of the paper information A (at step 406).

Furthermore, in the case that "the paper information A is not initialized" and "the content of the paper information A is not the same as the content of the paper information B" as the result of the comparison at step 404 (NO at step 404), the printing apparatus 20 temporarily stops the printing and displays a message prompting the user to carry out paper replacement on the operation panel 22 (at step 408). The message displayed on the operation panel 22 is "replace the paper stored in the paper feed tray with the paper to be printed" or "replace the paper" for example.

According to the message displayed on the operation panel 22, the user replaces the paper stored in the paper feed tray with the paper having the paper size of the page to be printed.

After completing the paper replacement at the paper feed tray, the user inputs a print restart instruction to the printing apparatus 20 through the operation panel 22.

Upon receiving the print restart instruction from the user who has completed the paper replacement (YES at step 409), the printing apparatus 20 prints the image data of one page (at step 405).

Then, when the printing of the image data of one page is completed normally, the paper information of the page printed normally is stored in the RAM 25 as "the paper information of the page printed immediately before (the paper information A)" (at step 406).

In the case that the printing of the image data of one page is carried out but the print job is not yet completed (NO at step 407), the paper information of the page to be printed next (the paper information B) is obtained using the paper information comparing means 33 (at step 403).

Then, "the paper information of the page printed immediately before (the paper information A)" stored in the RAM 25 is compared with the paper information B of the page to be printed next using the paper information comparing means 33 (at step 404).

Moreover, in the case that the printing of the image data of one page is carried out and the print job is completed (YES at step 407), "the paper information of the page printed immediately before" stored in the RAM 25 is initialized using the paper information clearing means 31 (at step 402).

Still further, in the case that "the timing of the automatic initialization" is set at "after the end of the printing of a print job" on the paper information initialization timing setting display 301 while the power of the printing apparatus 20 is turned on, the printing apparatus 20 carries out the processing beginning with step 402 described referring to FIG. 4, that is, the initialization of the paper information of the RAM 25. The subsequent processing is the same as that described referring to FIG. 4.

In the case that the timing at which the paper information is automatically initialized is set at "after the end of the printing of a print job" in the printing apparatus 20, "the paper information of the page printed immediately before" stored in the RAM 25 is initialized as described above after the power is turned on or after the printing of the print job is completed.

Since the paper information is initialized after the printing of the print job is completed, the paper information of the last page of the print job is not succeeded to the paper information of the next print job at the printing start time thereof.

Next, the result of the processing carried out by the printing apparatus 20 in the case that the timing at which the paper information is automatically initialized is set at "after the end of the printing of a print job" will be described below referring to FIG. 5.

Figure 5:
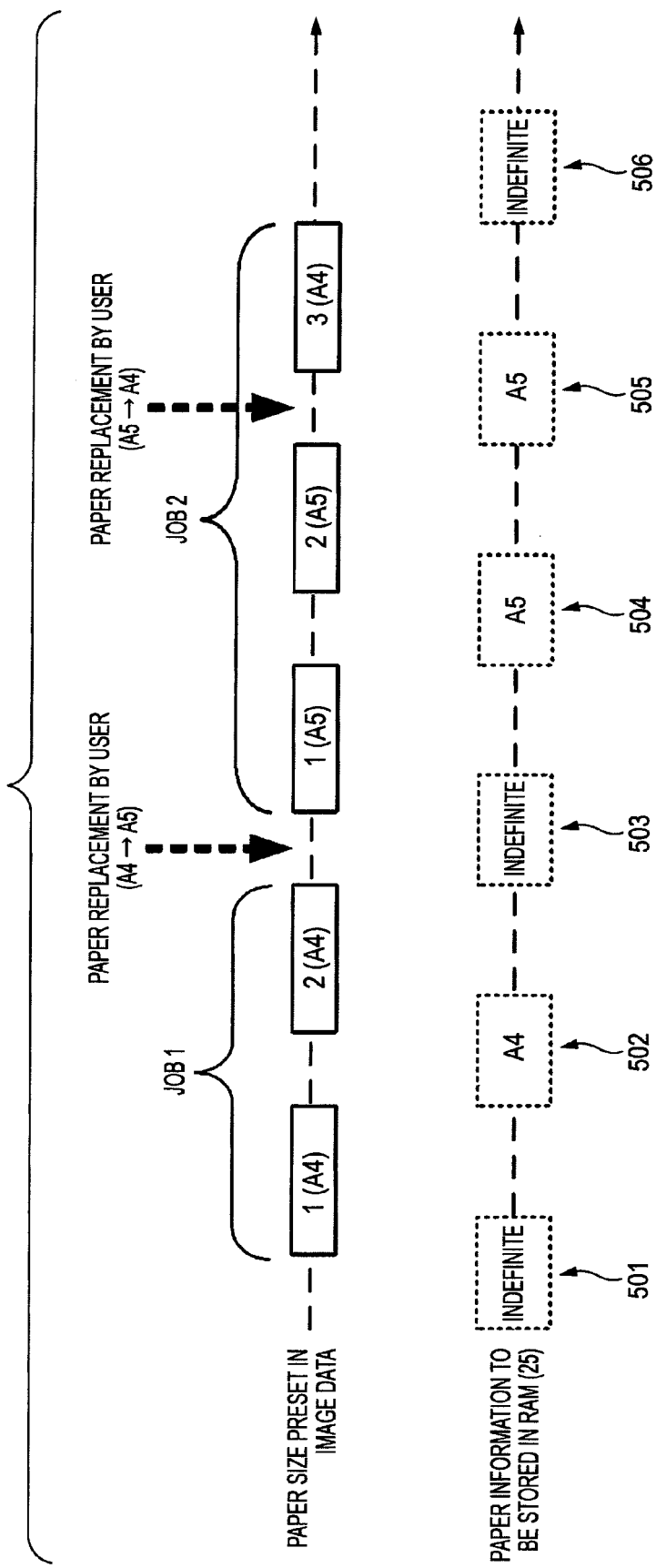
FIG. 5 is a view showing paper sizes set in image data and paper information to be stored in a RAM 25.

FIG. 5 is a view showing the paper size of the paper on which the image data to be processed in the printing apparatus 20 is printed (the paper size preset in the image data) and "the paper information of the page printed immediately before" to be stored in the RAM 25 in the case that the timing at which the paper information is automatically initialized is set at "after the end of the printing of a print job."

The following describes the processing carried out in the printing apparatus 20 in the case that the timing at which the paper information is automatically initialized is set at "after the end of the printing of a print job" and also in the case that print jobs, job 1 and job 2, are processed as shown in FIG. 5.

The paper size of the first page preset in the image data of the job 1 is A4 and the paper size of the second page is A4. Furthermore, the paper size of the first page preset in the image data of the job 2 is A5, the paper size of the second page is A5, and the paper size of the third page is A4.

Before the job 1 is processed in the printing apparatus 20, the paper information A serving as "the paper information of the page printed immediately before" stored in the RAM 25 is in its initialized state as shown in FIG. 5 (reference No. 501).

When the printing apparatus 20 prints the image of the first page on A4 size paper as the job 1 (print job), the size A4 is stored as "the paper information of the page printed immediately before" in the RAM 25 (reference No. 502).

In addition, when the printing apparatus 20 prints the image of the second page on A4 size paper as the job 1 (print job), the size A4 is stored once in the RAM 25 as "the paper information of the page printed immediately before" (at step 406 of FIG. 4). However, since the second page of the job 1 is the last page of the job 1, the job 1 is completed (YES at step 407), and the paper information of the RAM 25 is initialized (at step 402 of FIG. 4, reference No. 503).

Since the first page of the job 2 is printed on A5 size paper different from the A4 size paper on which the last page of the job 1 has been printed, the user instructing the printing of the job 2 replaces the A4 size paper stored in the paper feed tray of the printing apparatus 20 and used for the job 1 with A5 size paper to be used for the job 2 after the printing of the job 1 is completed.

After the printing of the job 1 is completed in the printing apparatus 20, the A4 size paper stored in the paper feed tray is replaced with the A5 size paper by the user.

After replacing the A4 size paper stored in the paper feed tray of the printing apparatus 20 with the A5 size paper, the user issues a print instruction to carry out the printing of the job 2 in the printing apparatus 20.

The paper information stored in the RAM 25 has been initialized when the printing of the job 1 is completed in the printing apparatus 20. Hence, when the user issues the print instruction from the PC 10 to start the printing of the job 2 in the printing apparatus 20, even in the case that the paper (A4) on which the last page of the job 1 has been printed previously is different from the paper (A5) to be used for the printing of the first page of the job 2, the printing is not stopped temporarily in the printing apparatus 20 and the user is not prompted to carry out paper replacement.

Since the paper information of the RAM 25 has been initialized when the first page of the job 2 is printed in the printing apparatus 20, YES is determined at step 404. As a result, the printing is not stopped temporarily and the printing of the first page of the job 2 is carried out (at step 405 of FIG. 4).

When the printing apparatus 20 prints the image of the first page on A5 size paper as the job 2 (print job), the size A5 is stored as "the paper information of the page printed immediately before" in the RAM 25 (reference No. 504).

Next, when the printing apparatus 20 prints the image of the second page on A5 size paper as the job 2 (print job), the size A5 is stored as "the paper information of the page printed immediately before" in the RAM 25 (reference No. 505).

Subsequently, when the printing apparatus 20 prints the image of the third page as the job 2 (print job), the paper size of the third page is A4 and is different from the paper size, A5, of the second page printed immediately before.

Hence, since "the paper information of the page printed immediately before" (the paper information A) stored in the RAM 25 is different from the paper size (the paper information B) of the third page of the job 2 (NO at step 404 of FIG. 4), the printing apparatus 20 temporarily stops the printing and displays a message prompting the user to carry out paper replacement on the operation panel 22 (at step 408 of FIG. 4) before the third page of the job 2 is printed.

After confirming the message displayed on the operation panel 22, the user replaces the paper stored in the paper feed tray of the printing apparatus 20 with A4 size paper.

After the paper replacement, the user inputs an instruction for resuming the printing through the operation panel 22.

After receiving the instruction for resuming the printing from the operation panel 22 (YES at step 409), the printing apparatus 20 prints the third page of the job 2.

When the printing of the third page of the job 2 is carried out on the A4 size paper, the size A4 is stored once in the RAM 25 as "the paper information of the page printed immediately before." However, since the third page of the job 2 is the last page of the job 2, the job 2 is completed (YES at step 407). Hence, the paper information stored in the RAM 25 is initialized (at step 402 of FIG. 4, reference No. 506).

In the case that the timing at which the paper information is automatically initialized is set at "after the end of the printing of a print job" in the printing apparatus 20, the paper information of the RAM 25 is initialized after the printing of the print job is completed as described above. Hence, in the case that the paper size of the last page of the preceding job is different from the paper size of the first page of the job to be instructed so as to be printed next, as in the case of the job 1 and the job 2 described above, and even if the paper replacement is carried out after the printing of the job 1 by the user and the printing of the job 2 is instructed so as to be printed, the printing is not stored temporarily and the user is not prompted to carry out the paper replacement before the first page of the job 2 is printed.

Next, the processing in the printing apparatus 20 in the case that the timing at which the paper information is automatically initialized is set at "before the start of the printing of a print job" will be described below referring to FIG. 6.

Figure 6:
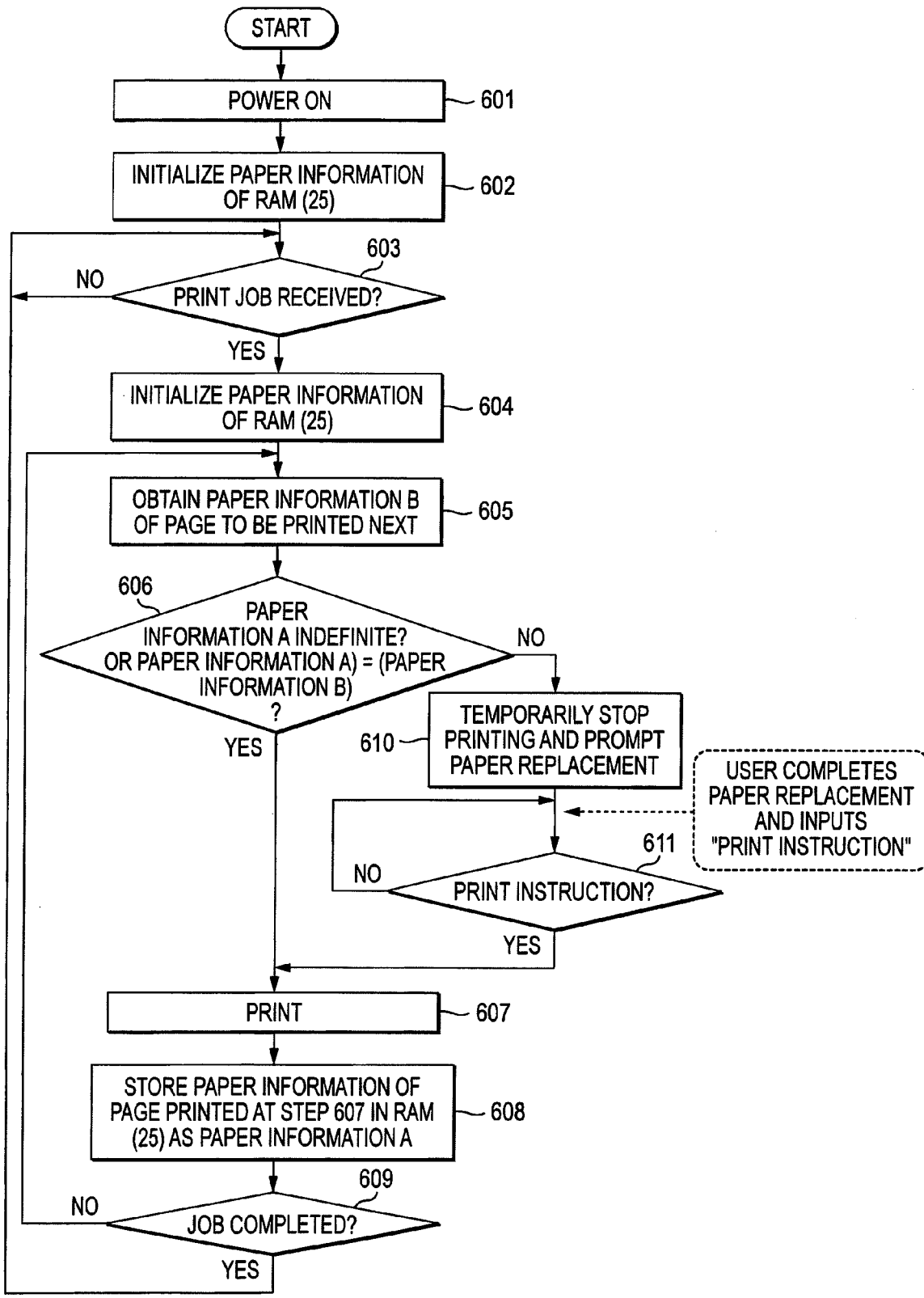
FIG. 6 is a flowchart showing processing in the case that paper information is initialized "before the start of the printing of a print job"

FIG. 6 is a flowchart showing the processing carried out by the printing apparatus 20 in the case that the timing at which the paper information is automatically initialized is set at "before the start of the printing of a print job."

The content described referring to FIG. 6 corresponds to the case in which "the timing at which the paper information is automatically initialized" is set through the DIP switch. However, in the case that "the timing at which the paper information is automatically initialized" is set at "before the start of the printing of a print job" on the paper information initialization timing setting display 301 while the power of the printing apparatus 20 is turned on, the processing starts in the middle of the flowchart shown in FIG. 6 as described later in detail.

When the power of the printing apparatus 20 is turned from off to on (at step 601), the paper information of the RAM 25 of the printing apparatus 20 is initialized (at step 602).

In the printing apparatus 20, the receiving means 34 receives a print job (YES at step 603), and the printing means 32 generates image data by analyzing the print job.

After the image data to be printed first in the received print job is generated, the paper information of the RAM 25 is initialized (at step 604).

Then, the CPU 26 obtains the paper information of the page P2 to be printed next (the paper information B) using the paper information comparing means 33 (at step 605).

In addition, the CPU 26 uses the paper information comparing means 33 to obtain "the paper information of the page P1 printed immediately before" (the paper information A) to be stored in the RAM 25 using the paper information storing means 30.

Then, the CPU 26 uses the paper information comparing means 33 to compare the paper information B (the paper information of the page P2 to be printed next) with the paper information A (the paper information of the page P1 printed immediately before) stored in the RAM 25 to judge coincidence therebetween (at step 606).

In the case that "the paper information A is initialized" or "the content of the paper information A is the same as the content of the paper information B" as the result of the comparison between the paper information A and the paper information B obtained by the CPU 26 (YES at step 606), the printing of the page P2 is carried out (at step 607).

Then, when the printing of one page of the image data is completed successfully at step 607, the paper information of the printed page, i.e., the paper information (the paper information B) compared in advance using the paper information comparing means 33, is stored in the RAM 25 as "the paper information of the page printed immediately before" using the paper information storing means 30 (at step 608).

Furthermore, in the case that "the paper information A is not initialized" and "the content of the paper information A is not the same as the content of the paper information B" as the result of the comparison at step 606 (NO at step 606), the printing apparatus 20 temporarily stops the printing and displays a message prompting the user to carry out paper replacement on the operation panel 22 (at step 610).

According to the message displayed on the operation panel 22, the user replaces the paper stored in the paper feed tray with the paper having the paper size of the page to be printed next.

After the paper replacement at the paper feed tray is completed, the user inputs a print restart instruction to the printing apparatus 20 through the operation panel 22.

Upon receiving the print restart instruction from the user who has completed the paper replacement (YES at step 611), the printing apparatus 20 prints the image data of one page (at step 607).

Then, when the printing of the image data of one page is completed normally, the paper information of the page printed normally is stored in the RAM 25 as "the paper information of the page printed immediately before (the paper information A)" (at step 608).

In the case that the printing of the image data of one page is carried out but the print job is not yet completed (NO at step 609), the paper information of the page to be printed next (the paper information B) is obtained using the paper information comparing means 33 (at step 605).

Then, "the paper information of the page printed immediately before (the paper information A)" stored in the RAM 25 is compared with the paper information B of the page to be printed next using the paper information comparing means 33 (at step 606).

Moreover, in the case that the printing of the image data of one page is carried out and the print job is completed (YES at step 609), the receiving means 34 is set in a state of waiting for the reception of a print job (NO at step 603).

In the case that the timing at which the paper information is automatically initialized is set at "before the start of the printing of a print job" in the printing apparatus 20, the paper information is initialized as described above before the start of the printing of the print job. Hence, when the printing of the print job is started, the paper information of the last page of the preceding print job is not succeeded.

Furthermore, in the case that "the timing of the automatic initialization" is set at "before the start of the printing of a print job" on the paper information initialization timing setting display 301 while the power of the printing apparatus 20 is turned on, the printing apparatus 20 carries out the processing beginning with step 602 described referring to FIG. 6, that is, the initialization of the paper information of the RAM 25. The subsequent processing is the same as that described referring to FIG. 6.

In the case that the timing at which the paper information is automatically initialized is set at "before the start of the printing of a print job" in the printing apparatus 20, the paper information stored in the RAM 25 is initialized as described above before a print job is received using the receiving means 34 and the printing of the first page of the generated image data is started. Hence, even if the paper size of the last page printed in the preceding print job is different from the paper size of the first page to be received using the receiving means 34 and then printed, the printing is not stopped temporarily and the user is not prompted to carry out paper replacement before the start of the printing of the print job received using the receiving means 34.

Hence, in the case that the paper size of the last page printed in the preceding print job (the paper size of the page printed immediately before) is different from the paper size of the first page of the print job to be instructed so as to be printed next, when the user replaces the paper of the paper feed tray before issuing the print instruction and then the user issues the print instruction, the printing based on the print instruction is carried out by the printing apparatus 20 without the printing by the printing apparatus 20 being stopped temporarily.

Next, the processing in the printing apparatus 20 in the case that the timing at which the paper information is automatically initialized is set at "after the end of the printing of all the print jobs stored in a queue" will be described below referring to FIG. 7.

Figure 7:
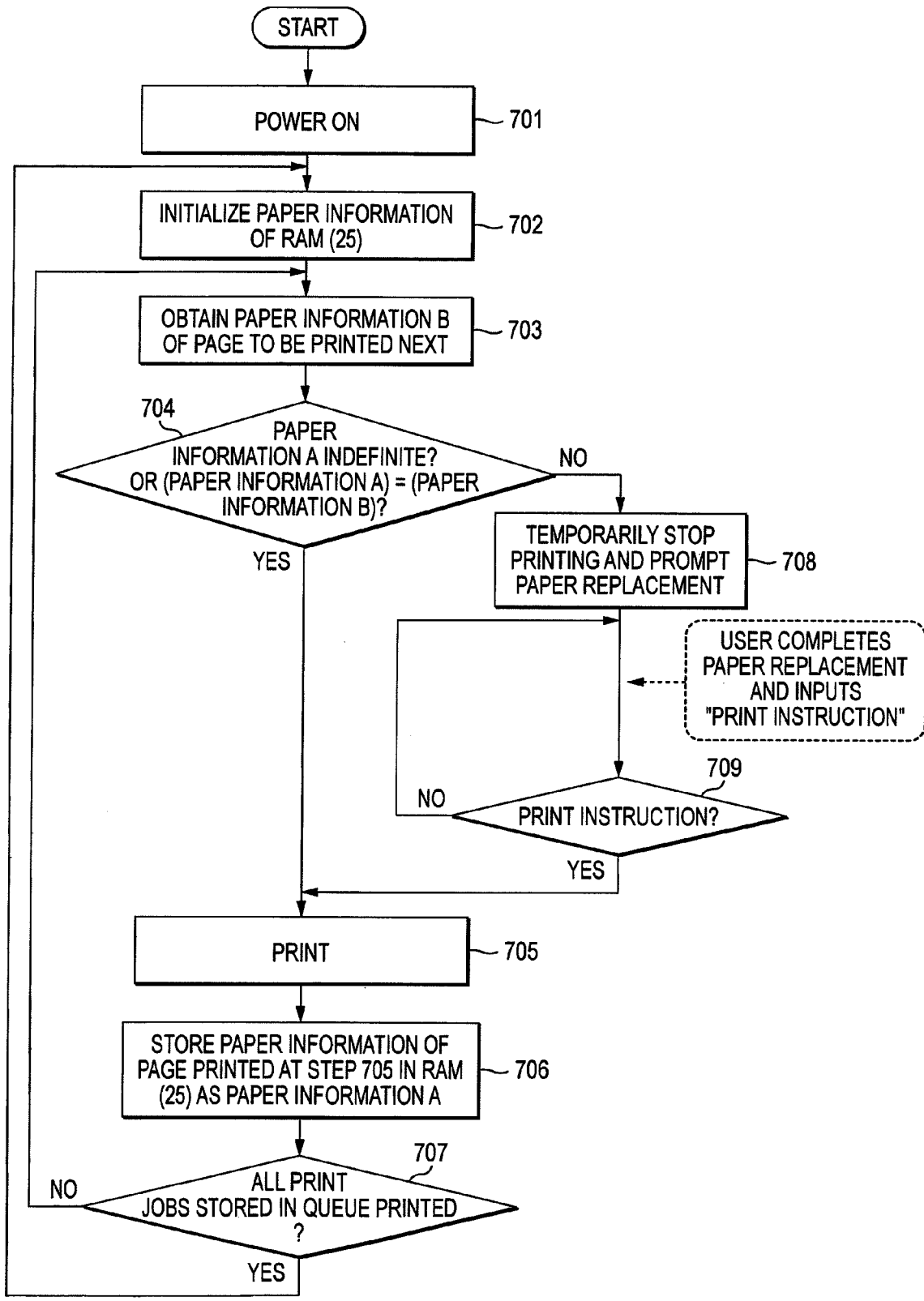
FIG. 7 is a flowchart showing processing in the case that paper information is initialized "after the end of the printing of all the print jobs stored in a queue"

FIG. 7 is a flowchart showing the processing carried out by the printing apparatus 20 in the case that the timing at which the paper information is automatically initialized is set at "after the end of the printing of all the print jobs stored in a queue."

The content described referring to FIG. 7 corresponds to the case in which "the timing at which the paper information is automatically initialized" is set through the DIP switch. However, in the case that "the timing at which the paper information is automatically initialized" is set at "after the end of the printing of all the print jobs stored in a queue" on the paper information initialization timing setting display 301 while the power of the printing apparatus 20 is turned on, the processing starts in the middle of the flowchart shown in FIG. 7 as described later in detail.

When the power of the printing apparatus 20 is turned from off to on (at step 701), the paper information of the RAM 25 of the printing apparatus 20 is initialized (at step 702).

In the printing apparatus 20, the receiving means 34 receives a print job, and the printing means 32 generates image data by analyzing the print job.

When the page of the image data to be printed using the printing means 32 is determined, the CPU 26 obtains the paper size of the page P2 to be printed next (the paper information B) using the paper information comparing means 33 (at step 703).

In addition, the CPU 26 uses the paper information comparing means 33 to obtain "the paper information of the page P1 printed immediately before (the paper information A)" stored in the RAM 25 using the paper information storing means 30.

Then, the CPU 26 uses the paper information comparing means 33 to compare the paper information B (the paper information of the page P2 to be printed next) with the paper information A (the paper information of the page P1 printed immediately before) to judge coincidence therebetween (at step 704).

In the case that "the paper information A is initialized" or "the content of the paper information A is the same as the content of the paper information B" as the result of the comparison between the paper information A and the paper information B obtained by the CPU 26 (YES at step 704), the printing of the page P2 is carried out (at step 705).

Then, when the printing of one page of the image data is completed successfully at step 705, the paper information of the printed page, i.e., the paper information (the paper information B) compared in advance using the paper information comparing means 33, is stored in the RAM 25 as "the paper information of the page printed immediately before" using the paper information storing means 30 (at step 706). In other words, when the printing of one page is completed successfully (at step 705), the content of the paper information B compared at step 704 is stored in the RAM 25 as the content of the paper information A (at step 706).

Furthermore, in the case that "the paper information A is not initialized" and "the content of the paper information A is not the same as the content of the paper information B" as the result of the comparison at step 704 (NO at step 704), the printing apparatus 20 temporarily stops the printing and displays a message prompting the user to carry out paper replacement on the operation panel 22 (at step 708).

According to the message displayed on the operation panel 22, the user replaces the paper stored in the paper feed tray with the paper to be printed and being set in the image data to be printed.

After the paper replacement at the paper feed tray is completed, the user inputs a print restart instruction to the printing apparatus 20 through the operation panel 22.

Upon receiving the print restart instruction from the user who has completed the paper replacement (YES at step 709), the printing apparatus 20 prints the image data of one page (at step 705).

Then, in the case that not all the print jobs stored in the queue are printed after the printing of the image data of one page is carried out (the image data to be printed remains unprinted) (NO at step 707), the paper size of the page to be printed next (the paper information B) is obtained (at step 703).

In the printing apparatus 20, "queue" is herein a mechanism in which print jobs waiting for printing are stored and placed in a printing standby state.

Then, "the paper information of the page printed immediately before (the paper information A)" stored in the RAM 25 is compared with the paper information B of the page to be printed next using the paper information comparing means 33 (at step 704).

Furthermore, after the printing of the image data of one page is carried out at step 705 and in the case that all the print jobs stored in the queue have been printed (no print jobs are stored in the queue) (YES at step 707), "the paper information of the page printed immediately before" stored in the RAM 25 is initialized using the paper information clearing means 31 (at step 702).

Moreover, in the case that "the timing of the automatic initialization" is set at "after the end of the printing of all the print jobs stored in a queue" on the paper information initialization timing setting display 301 while the power of the printing apparatus 20 is turned on, the printing apparatus 20 carries out the processing beginning with step 702 described referring to FIG. 7, that is, the initialization of the paper information of the RAM 25. The subsequent processing is the same as that described referring to FIG. 7.

As described above, in the case that the timing at which the paper information is automatically initialized is set at "after the end of the printing of all the print jobs stored in a queue" in the printing apparatus 20, the paper information stored in the RAM 25 is initialized after all the print jobs stored in the queue have been printed and no print jobs are stored in the queue. Hence, when a print instruction is transmitted from the PC 10 in the case that all the print jobs stored in the queue have been printed and no print jobs are stored in the queue, even if the paper size of the page printed immediately before is different from the paper size of the first page to be printed according to the print instruction transmitted from the PC 10, the printing is not stopped temporarily and the user is not prompted to carry out paper replacement before the start of the printing of the print job that is sent according to the print instruction transmitted from the PC 10 and received using the receiving means 34.

Hence, if the paper size of the page printed immediately before is different from the paper size of the page to be printed first in the print job sent to the printing apparatus 20 according to the print instruction transmitted from the PC 10 in the case that all the print jobs stored in the queue have been printed and no print jobs are stored in the queue and if the user replaces the paper of the paper feed tray of the printing apparatus 20 before issuing the print instruction from the PC 10 and then issues the print instruction, the printing based on the print instruction is carried out by the printing apparatus 20 without the printing by the printing apparatus 20 being stopped temporarily.

Next, the processing in the printing apparatus 20 in the case that the timing at which the paper information is automatically initialized is set at "before the start of the printing of the print jobs stored in a queue beginning with 0" will be described below referring to FIG. 8.

Figure 8:
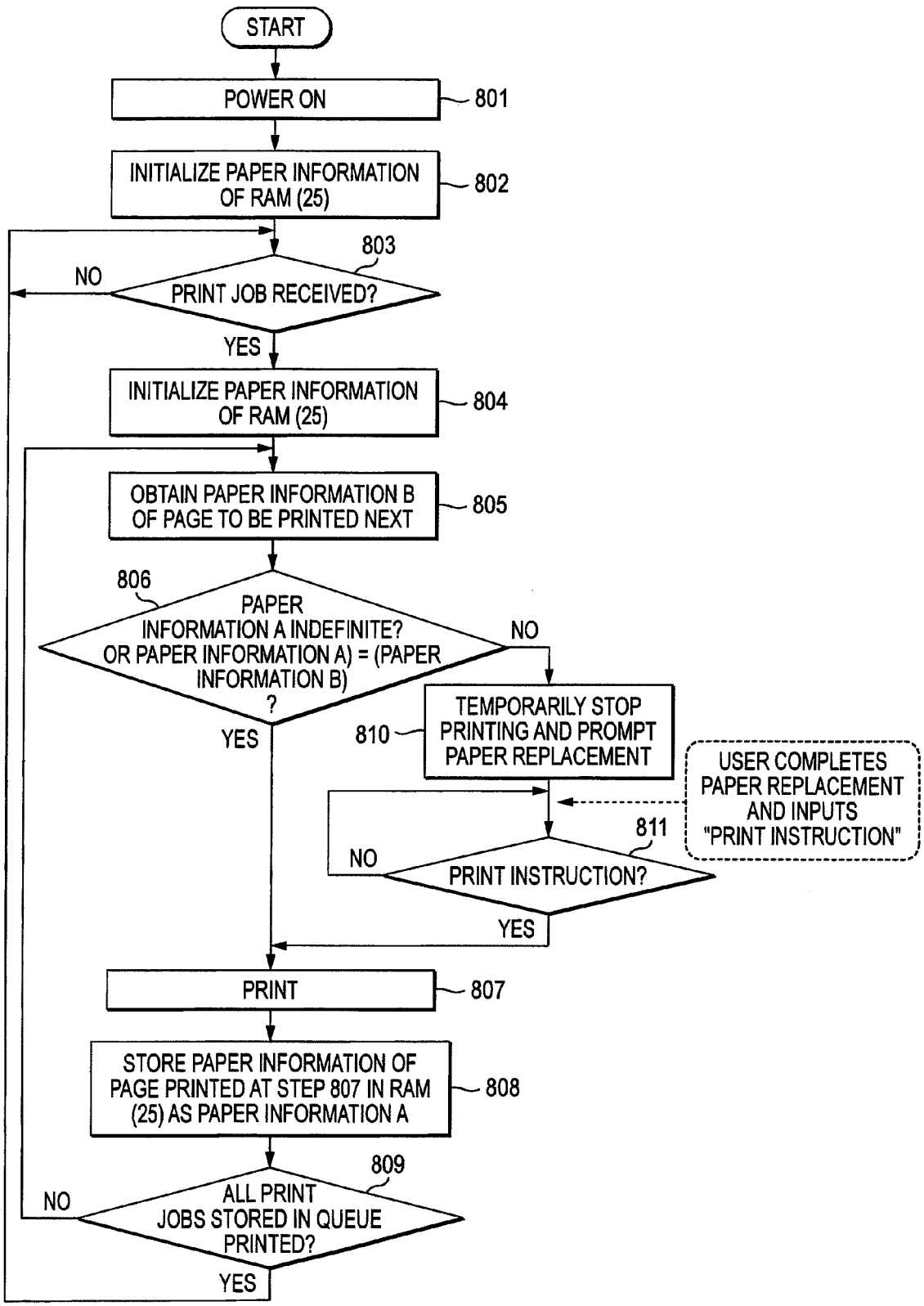
FIG. 8 is a flowchart showing processing in the case that paper information is initialized "before the start of the printing of the print jobs stored in a queue beginning with 0"

FIG. 8 is a flowchart showing the processing carried out by the printing apparatus 20 in the case that the timing at which the paper information is automatically initialized is set at "before the start of the printing of the print jobs stored in a queue beginning with 0."

The content described referring to FIG. 8 corresponds to the case in which "the timing at which the paper information is automatically initialized" is set through the DIP switch. However, in the case that "the timing at which the paper information is automatically initialized" is set at "before the start of the printing of the print jobs stored in a queue beginning with 0" on the paper information initialization timing setting display 301 while the power of the printing apparatus 20 is turned on, the processing starts in the middle of the flowchart shown in FIG. 8 as described later in detail.

When the power of the printing apparatus 20 is turned from off to on (at step 801), the paper information of the RAM 25 of the printing apparatus 20 is initialized (at step 802).

In the printing apparatus 20, the receiving means 34 receives a print job (YES at step 803), and the printing means 32 generates image data by analyzing the print job.

After the image data to be printed first in the received print job is generated, the paper information of the RAM 25 is initialized (at step 804).

Then, the CPU 26 obtains the paper size of the page P2 to be printed next (the paper information B) using the paper information comparing means 33 (at step 805).

In addition, the CPU 26 uses the paper information comparing means 33 to obtain "the paper information of the page P1 printed immediately before (the paper information A)" to be stored in the RAM 25 using the paper information storing means 30.

Then, the CPU 26 uses the paper information comparing means 33 to compare the paper information B (the paper information of the page P2 to be printed next) with the paper information A (the paper information of the page P1 printed immediately before) stored in the RAM 25 to judge coincidence therebetween (at step 806).

In the case that "the paper information A is initialized" or "the content of the paper information A is the same as the content of the paper information B" as the result of the comparison between the paper information A and the paper information B obtained by the CPU 26 (YES at step 806), the printing of the page P2 is carried out (at step 807).

Then, when the printing of one page of the image data is completed successfully at step 807, the paper information of the printed page, i.e., the paper information (the paper information B) compared in advance using the paper information comparing means 33, is stored in the RAM 25 as "the paper information of the page printed immediately before" using the paper information storing means 30 (at step 808).

Furthermore, in the case that "the paper information A is not initialized" and "the content of the paper information A is not the same as the content of the paper information B" as the result of the comparison at step 806 (NO at step 806), the printing apparatus 20 temporarily stops the printing and displays a message prompting the user to carry out paper replacement on the operation panel 22 (at step 810).

According to the message displayed on the operation panel 22, the user replaces the paper stored in the paper feed tray with the paper having the paper size of the page to be printed next.

After the paper replacement at the paper feed tray is completed, the user inputs a print restart instruction to the printing apparatus 20 through the operation panel 22.

Upon receiving the print restart instruction from the user who has completed the paper replacement (YES at step 811), the printing apparatus 20 prints the image data of one page (at step 807).

Then, when the printing of the image data of one page is completed normally, the paper information of the page printed normally is stored in the RAM 25 as "the paper information of the page printed immediately before (the paper information A)" (at step 808).

In the case that the printing of the image data of one page is carried out at step 807 but not all the print jobs stored in the queue are printed (NO at step 809), the paper size of the page to be printed next (the paper information B) is obtained using the paper information comparing means 33 (at step 805).

Then, "the paper information of the page printed immediately before (the paper information A)" stored in the RAM 25 is compared with the paper information B of the page to be printed next using the paper information comparing means 33 (at step 806).

Moreover, in the case that the printing of the image data of one page is carried out and all the print jobs stored in the queue are printed (YES at step 809), the receiving means 34 is in a state of waiting for the reception of a print job (NO at step 803).

Furthermore, in the case that "the timing of the automatic initialization" is set at "before the start of the printing of the print jobs stored in a queue beginning with 0" on the paper information initialization timing setting display 301 while the power of the printing apparatus 20 is turned on, the printing apparatus 20 carries out the processing beginning with step 802 described referring to FIG. 8, that is, the initialization of the paper information of the RAM 25. The subsequent processing is the same as that described referring to FIG. 8.

As described above, in the case that the timing at which the paper information is automatically initialized is set at "before the start of the printing of the print jobs stored in a queue beginning with 0" in the printing apparatus 20, the paper information stored in the RAM 25 is initialized after all the print jobs stored in the queue are printed and before a new print job is received and the printing of the received print job is started. Hence, when a print instruction is transmitted from the PC 10 in the case that all the print jobs stored in the queue have been printed and no print jobs are stored in the queue, even if the paper size of the page printed immediately before is different from the paper size of the page to be printed first according to the print instruction transmitted from the PC 10, the printing is not stopped temporarily and the user is not prompted to carry out paper replacement before the start of the printing of the print job that is sent according to the print instruction transmitted from the PC 10 and received using the receiving means 34.

Hence, if the paper size of the page printed immediately before is different from the paper size of the page to be printed first in the print job sent to the printing apparatus 20 according to the print instruction transmitted from the PC 10 in the case that all the print jobs stored in the queue have been printed and no print jobs are stored in the queue and if the user replaces the paper of the paper feed tray of the printing apparatus 20 before issuing the print instruction from the PC 10 and then issues the print instruction, the printing based on the print instruction is carried out by the printing apparatus 20 without the printing by the printing apparatus 20 being stopped temporarily.

In the printing apparatus 20, in the case that "the timing at which the paper information is automatically initialized" is selected on the paper information initialization timing setting display 301 of the printing apparatus from the state in which "the paper information is not automatically initialized," the paper information of the RAM 25 is initialized after "the timing at which the paper information is automatically initialized" is selected, and then various printing processes are carried out.

The printing apparatus 20 may be a multifunctional machine having not only the function of printing print data transmitted from the PC 10 but also a copying function, a facsimile function, etc.

The paper feed tray of the printing apparatus 20 has been described as not having a paper presence confirmation function for detecting the supply/delivery of paper. However, the printing apparatus 20 may have a plurality of paper feed trays, and the plurality of paper feed trays may have a common paper presence sensor. This is because in the case that the plurality of paper feed trays have a common paper presence sensor and, for example, in a state in which one of the paper feed trays has been loaded with paper and the other paper feed tray is newly loaded with paper, the paper loaded in the other paper feed tray is not detected. Hence, the replacement of the paper may not be substantially detected in some cases.

The image forming program according to the present invention may be provided through communication means as a matter of course or may also be recorded on recording media, such as CD-ROMs, and provided with such recording media.

Exemplary Embodiment 2

In a second exemplary embodiment, a printing apparatus 20a equipped with a print engine 50 instead of the printing means 32 of the printing apparatus 20 described in the first exemplary embodiment will be described below. In other words, the printing apparatus 20a is equipped with the controller 21, the operation panel 22 and the print engine 50.

Components having the same reference numbers as those described in the first exemplary embodiment have the same functions and their descriptions are omitted in the second exemplary embodiment. In the second exemplary embodiment, however, in the descriptions of the components having the same reference numbers as those described in the first exemplary embodiment, the contents to be described in the second exemplary embodiment have higher priority than the contents described in the first exemplary embodiment.

First, the printing apparatus 20a equipped with the print engine 50 will be described below referring to FIG. 9.

Figure 9:
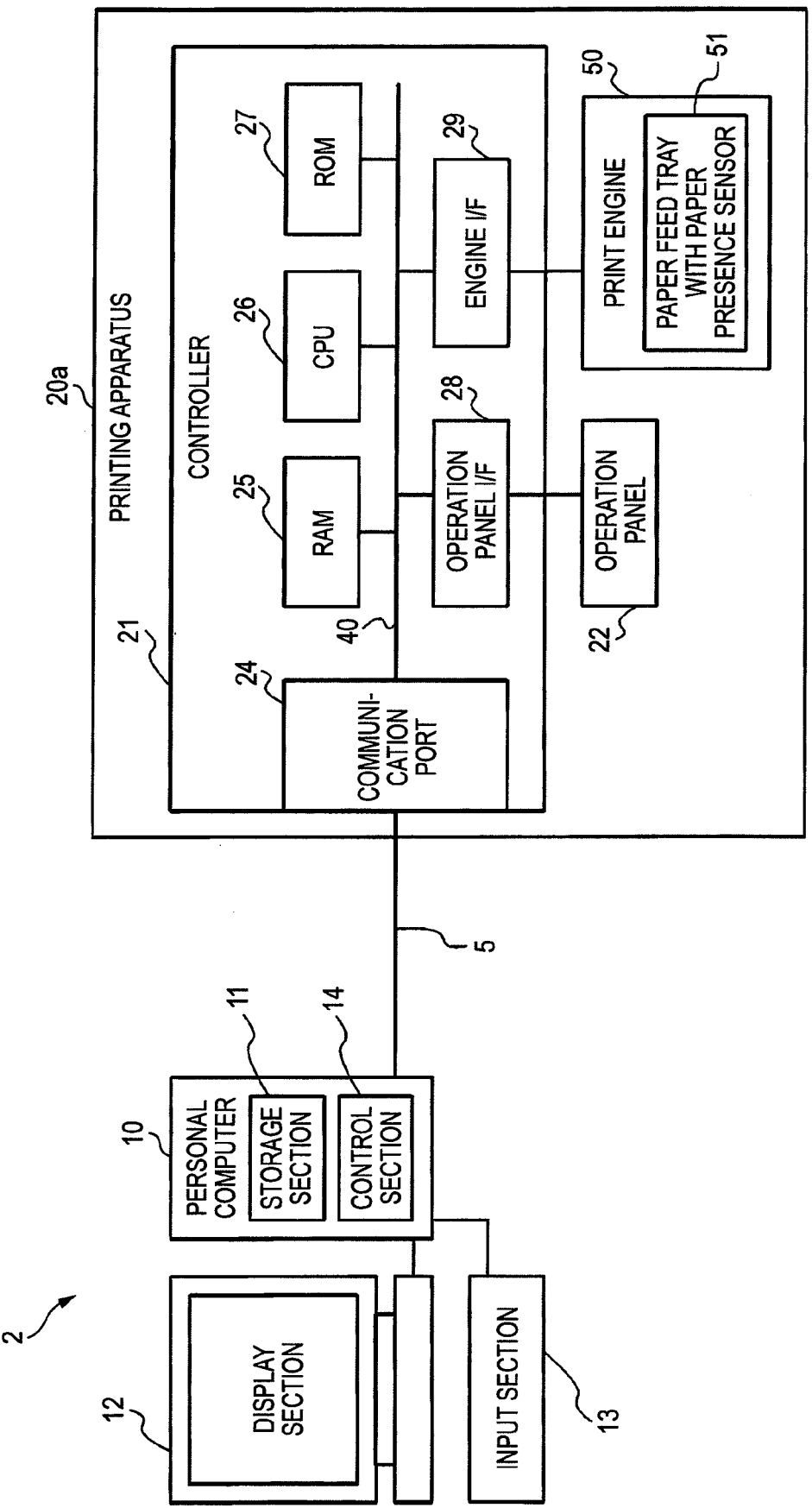
FIG. 9 is a view showing a configuration of a printing system 2.

FIG. 9 is a view showing a configuration of a printing system 2 equipped with the printing apparatus 20a and the PC 10.

As shown in FIG. 9, the printing apparatus 20a is equipped with the controller 21, the operation panel 22 and the print engine 50.

In addition, the printing apparatus 20a is connected to the PC 10 for transmitting print jobs via the communication line 5.

The printing apparatus 20a is equipped with the print engine 50 as shown in FIG. 9.

The print engine 50 has a function of printing the image data of a print job received by the printing apparatus 20a on paper and includes a paper feed tray 51 equipped with a paper presence sensor, a paper conveying mechanism, a photosensitive unit, an exposure unit, a fixing unit, etc.

The paper feed tray 51 equipped with a paper presence sensor has a paper presence sensor serving as a sensor for detecting whether paper is stored therein.

However, the paper feed tray 51 equipped with a paper presence sensor does not have a function for detecting the size of the paper stored in the paper feed tray 51 equipped with a paper presence sensor.

Furthermore, the printing apparatus 20a has the controller 21, and the controller 21 has the paper information storing means 30, the paper information clearing means 31, the printing means 32, the paper information comparing means 33 and the receiving means 34.

Next, the processing to be carried out by the printing apparatus 20a will be described below referring to FIG. 10. However, the timing at which "the paper information of the page printed immediately before" stored using the paper information storing means 30 in the printing apparatus 20a is automatically initialized may be set at "after the end of the printing of a print job" or "before the start of the printing of a print job" or "after the end of the printing of all the print jobs stored in a queue" or "before the start of the printing of the print jobs stored in a queue beginning with 0" as described in the first exemplary embodiment. The case in which the timing set at "after the end of the printing of a print job" is herein described as an example.

Figure 10:
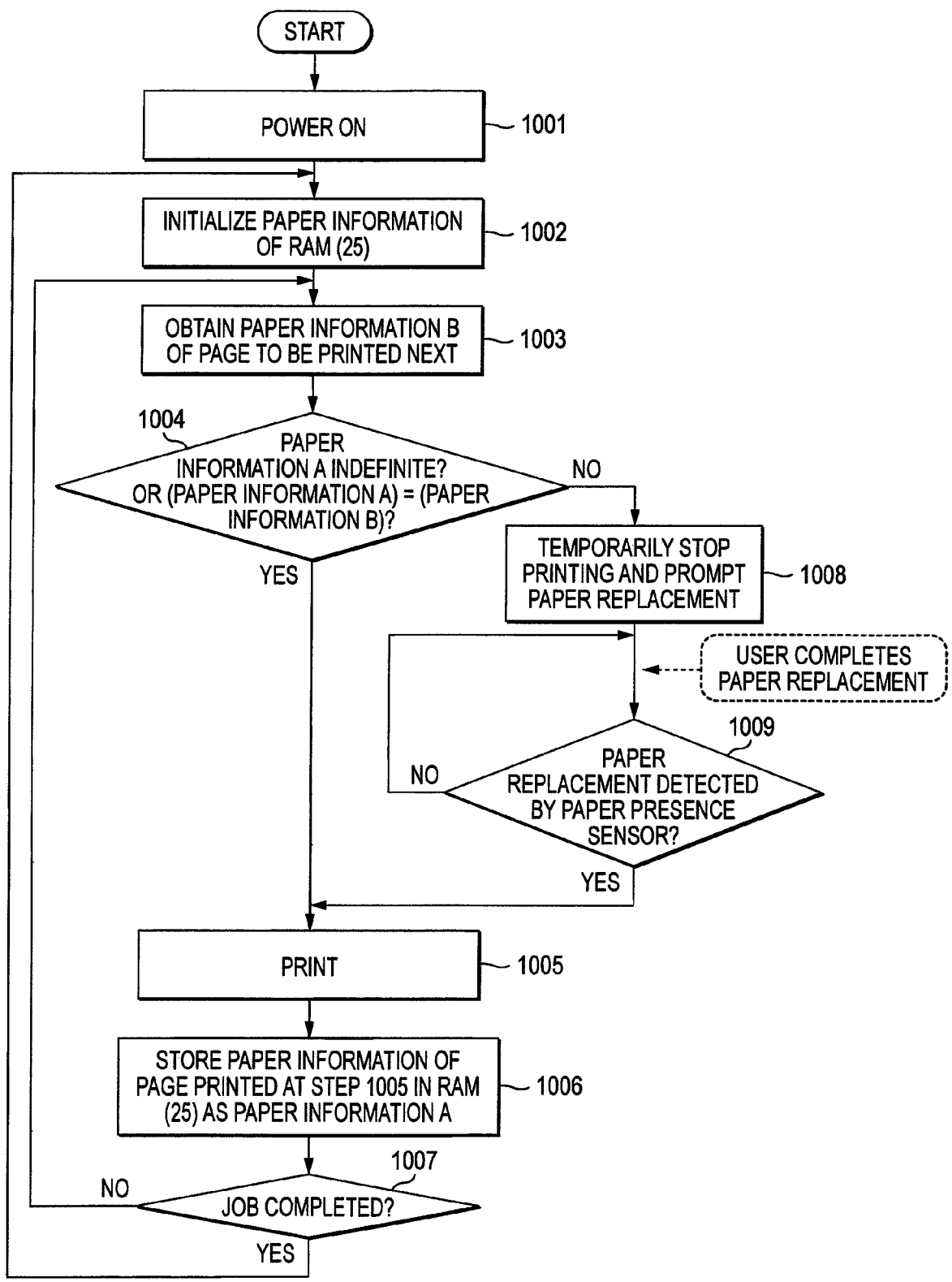

In the printing apparatus 20a, when the power of the printing apparatus 20a is turned from off to on (at step 1001), the paper information of the RAM 25 of the printing apparatus 20a is initialized (at step 1002) as shown in FIG. 10.

Furthermore, in the printing apparatus 20a, the receiving means 34 receives a print job, and the printing means 32 generates image data by analyzing the print job.

When the page of the image data to be printed using the printing means 32 is determined, the CPU 26 obtains the paper size of the page P2 to be printed next (the paper information B) using the paper information comparing means 33 (at step 1003).

In addition, the CPU 26 used the paper information comparing means 33 to obtain "the paper information of the page P1 printed immediately before" (hereafter, the paper information is referred to as paper information A) stored in the RAM 25 using the paper information storing means 30.

Then, the CPU 26 uses the paper information comparing means 33 to compare the paper information B (the paper information of the page P2 to be printed next) with the paper information A (the paper information of the page P1 printed immediately before) to judge coincidence therebetween (at step 1004).

In the case that "the paper information A is initialized" or "the content of the paper information A is the same as the content of the paper information B" as the result of the comparison between the paper information A and the paper information B obtained by the CPU 26 (YES at step 1004), the printing of the page P2 is carried out (at step 1005).

Then, when the printing of one page of the image data is completed successfully at step 1005, the paper information of the printed page, i.e., the paper information (the paper information B) compared in advance using the paper information comparing means 33, is stored in the RAM 25 as "the paper information of the page printed immediately before" using the paper information storing means 30 (at step 1006). In other words, when the printing of one page is completed successfully (at step 1005), the content of the paper information B compared at step 1004 is stored in the RAM 25 as the content of the paper information A (at step 1006).

Furthermore, in the case that "the paper information A is not initialized" and "the content of the paper information A is not the same as the content of the paper information B" as the result of the comparison at step 1004 (NO at step 1004), the printing apparatus 20*a* temporarily stops the printing and displays a message prompting the user to carry out paper replacement on the operation panel 22 (at step 1008). The message displayed on the operation panel 22 is "replace the paper stored in the paper feed tray with the paper to be printed" or "replace the paper" for example.

According to the message displayed on the operation panel 22, the user replaces the paper stored in the paper feed tray with the paper having the paper size of the page to be printed next.

Since the paper feed tray of the printing apparatus 20 described in the first exemplary embodiment is not equipped with a paper presence sensor, it is necessary for the user to input a print restart instruction to the printing apparatus 20 through the operation panel 22 after the paper replacement is carried out by the user. However, since the paper feed tray 51 of the printing apparatus 20*a* according to the second exemplary embodiment is equipped with a paper presence sensor, it is not necessary for the user to input the print restart instruction to the printing apparatus 20*a* after the paper replacement is carried out by the user.

Hence, in the printing apparatus 20*a*, after the paper replacement is carried out by the user, the paper presence sensor provided for the paper feed tray 51 detects the paper replacement.

The detection of the paper replacement using the paper presence sensor of the paper feed tray 51 is carried out based on the judgment of the CPU 26 that the detection state of the sensor changes from the state of "paper presence detection" to the state of "paper absence detection" when the paper stored in the paper feed tray 51 is removed and that the detection state of the sensor changes from the state of "paper absence detection" to the state of "paper presence detection" when new paper is stored in the paper feed tray 51. In other words, it is judged that the paper replacement is carried out when the CPU 26 judges that the detection state of the paper presence sensor changes from the state of "paper presence detection" to the state of "paper absence detection" and then judges that the detection state changes from the state of "paper absence detection" to the state of "paper presence detection."

When the paper presence sensor detects that the paper replacement is carried out by the user on the basis of the judgment of the CPU 26 as described above (YES at step 1009), the image data of one page is printed (at step 1005).

Then, when the printing of the image data of one page is completed normally, the paper information of the page printed normally is stored in the RAM 25 as "the paper information of the page printed immediately before (the paper information A)" (at step 1006).

In the case that the printing of the image data of one page is carried out but the print job is not yet completed (NO at step 1007), the paper information of the page to be printed next (the paper information B) is obtained using the paper information comparing means 33 (at step 1003).

Then, "the paper information of the page printed immediately before" (the paper information A) stored in the RAM 25 is compared with the paper information B of the page to be printed next using the paper information comparing means 33 (at step 1004).

Moreover, in the case that the printing of the image data of one page is carried out and the print job is completed (YES at step 1007), "the paper information of the page printed immediately before" stored in the RAM 25 is initialized using the paper information clearing means 31 (at step 1002).

As described above, the printing apparatus 20 may be the printing apparatus 20*a* that is equipped with the paper feed tray 51 instead of the paper feed tray of the printing apparatus 20.

In addition, also in the printing apparatus 20*a*, the timing at which "the paper information of the page printed immediately before" stored using the paper information storing means 30 is automatically initialized may be set at "after the end of the printing of a print job" or "before the start of the printing of a print job" or "after the end of the printing of all the print jobs stored in a queue" or "before the start of the printing of the print jobs stored in a queue beginning with 0." Furthermore, although the process of detecting the paper replacement using the paper presence sensor (at step 1009) is carried out instead of the processes (at steps 409, 611, 709 and 811) in which the print restart instruction is received after the paper replacement in the printing apparatus 20, the other processes carried out in the printing apparatus 20*a* are the same as those carried out in the printing apparatus 20. Even in the case that the above-mentioned timing settings reach their respective timings, the processes in the printing apparatus 20*a* are the same as those carried out in the printing apparatus 20, except for the process of detecting the paper replacement using the paper presence sensor.

The printing apparatus 20*a* may be a multifunctional machine having not only the function of printing print data transmitted from the PC 10 but also a copying function, a facsimile function, etc.

In the printing apparatus 20*a*, in the case that "the timing at which the paper information is automatically initialized" is selected on the paper information initialization timing setting display 301 of the printing apparatus from the state in which "the paper information is not automatically initialized," the paper information of the RAM 25 is initialized after "the timing at which the paper information is automatically initialized" is selected, and then various printing processes are carried out.

The image forming program according to the present invention may be provided through communication means as a matter of course or may also be recorded on recording media, such as CD-ROMs, and provided with such recording media.

Exemplary Embodiment 3

In a third exemplary embodiment, a printing apparatus 20*b* will be described below in which the controller 21 of the printing apparatus 20 described in the first exemplary embodiment is further equipped with an NVRAM (non-volatile memory) 53.

Components having the same reference numbers as those described in the first exemplary embodiment have the same functions and their descriptions are omitted in the third exemplary embodiment. In the third exemplary embodiment, however, in the descriptions of the components having the same reference numbers as those described in the first exemplary embodiment, the contents to be described in the third exemplary embodiment have higher priority than the contents described in the first exemplary embodiment.

First, the printing apparatus 20*b* having the NVRAM 53 will be described below referring to FIG. 11.

Figure 11:
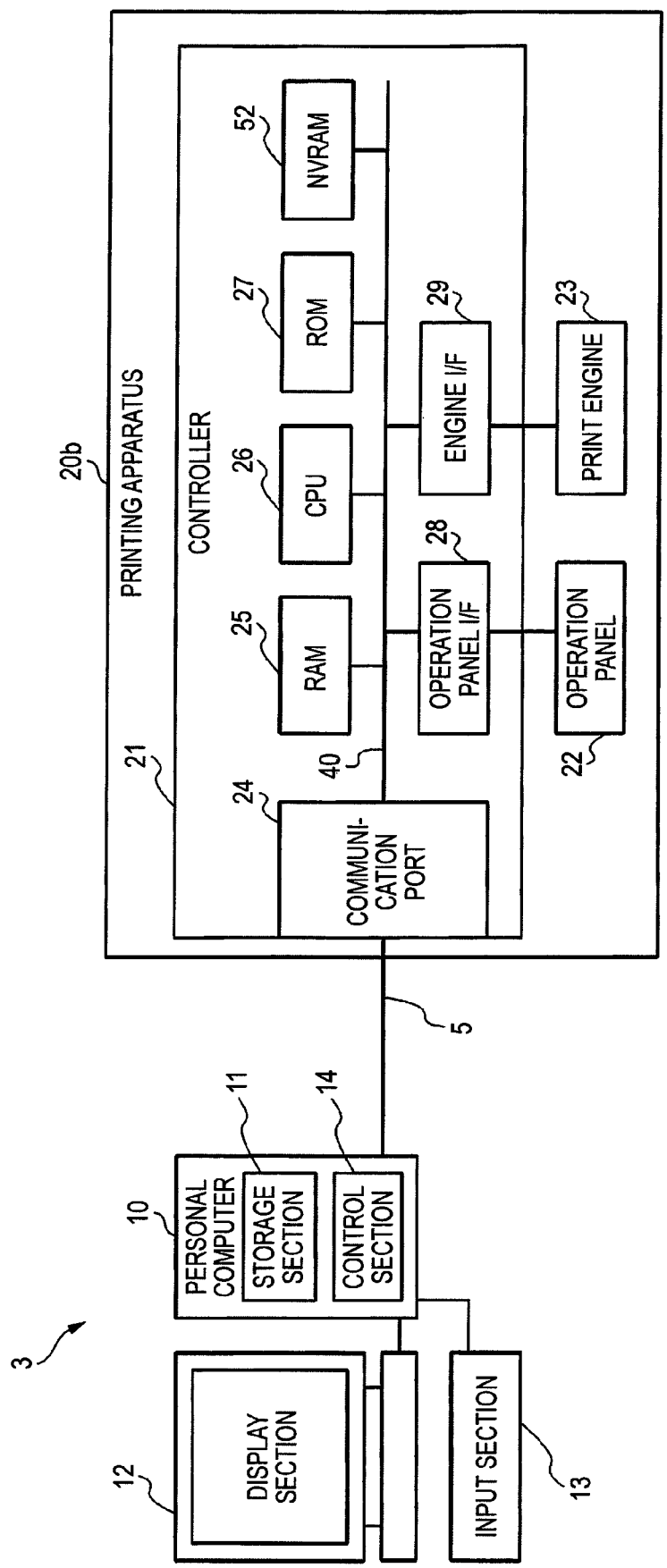
FIG. 11 is a view showing a configuration of a printing system 3.

FIG. 11 is a view showing a configuration of a printing system 3 equipped with the printing apparatus 20*b* and the PC 10.

As shown in FIG. 11, the printing apparatus 20*b* is equipped with a controller 52, the operation panel 22 and the print engine 23.

In addition, the printing apparatus 20*b* is connected to the PC 10 for transmitting print jobs via the communication line 5.

The printing apparatus 20*b* has the controller 52 equipped with the NVRAM 53 as shown in FIG. 11.

The controller 52 is equipped with the communication port 24, the RAM 25, the CPU 26, the ROM 27, the NVRAM 53, the operation panel I/F 28 and the engine I/F 29.

The RAM 25, a rewritable volatile memory, temporarily stores, for example, system variables for executing the image forming program stored in the ROM 27.

The NVRAM 53, a rewritable non-volatile memory, stores, at its specific storage area, the paper information of the page printed immediately before by storing a number corresponding to the paper information (paper size).

For example, the NVRAM 53 stores number "1" in the case that the paper information is A4 and stores number "2" in the case that the paper information is A5.

Furthermore, the NVRAM 53 stores number "0" in the case that the paper information is indefinite.

The state in which number "0" is stored as paper information in the NVRAM 53 is also referred to as "a state in which the paper information of the NVRAM 53 is initialized."

The controller 52 has functions similar to those of the controller 21 described in the first exemplary embodiment referring to FIG. 2.

In other words, the controller 52 has the paper information storing means 30, the paper information clearing means 31, the printing means 32, the paper information comparing means 33 and the receiving means 34.

When print data is printed normally, the paper information storing means 30 stores the paper size of the page printed immediately before as the paper information A in the NVRAM 53.

The paper information clearing means 31 initializes the paper information stored using the paper information storing means 30. More specifically, the paper information clearing means 31 stores number "0" instead of a number (for example, "1" in the case of A4) corresponding to a specific paper size at a location of the NVRAM 53 in which "the paper information of the page printed immediately before" is stored.

In the printing apparatus 20*b*, the timing at which "the paper information of the page printed immediately before" stored using the paper information storing means 30 is automatically initialized may be set at "after the end of the printing of a print job" or "before the start of the printing of a print job" or "after the end of the printing of all the print jobs stored in a queue" or "before the start of the printing of the print jobs stored in a queue beginning with 0" as in the case described in the first exemplary embodiment. However, the printing apparatus 20*b* may be configured so that the timing may be set using a DIP switch as in the case of the first exemplary embodiment. Furthermore, the printing apparatus 20*b* may also be configured so that the content of the setting may be received through the operation panel 22 and stored in the NVRAM 53 and so that the content of the setting stored in the NVRAM 53 is reflected after the power is turned on next time.

Next, the processing to be carried out by the printing apparatus 20*b* will be described below referring to FIG. 12. However, a case in which the timing at which "the paper information of the page printed immediately before" stored using the paper information storing means 30 is automatically initialized is set at "before the start of the printing of a print job" will be described below.

When the power of the printing apparatus 20*b* is turned from off to on (at step 1201), the CPU 26 judges whether the printing apparatus 20*b* is in the middle of printing (at step 1202).

Since the NVRAM 53 of the printing apparatus 20*b* stores unprinted image data, the CPU 26 judges that the printing apparatus 20*b* is in the middle of printing in the case that unprinted image data is present in the NVRAM 53.

In other words, a judgment is made at step 1202 as to whether the printing apparatus 20*b* is in the middle of the printing of a print job before the power of the printing apparatus 20*b* is turned off In the case that the printing apparatus 20*b* is not in the middle of printing (NO at step 1202), the receiving means 34 is set in a state of waiting for the reception of a print job (NO at step 1203 and NO at step 1202).

In the printing apparatus 20*b*, when the receiving means 34 receives a print job (YES at step 1203), the printing means 32 generates image data by analyzing the print job.

After the image data to be printed first in the received print job is generated, the paper information of the NVRAM 53 is initialized (at step 1204).

Then, the CPU 26 obtains the paper size of the page P2 to be printed next (the paper information B) using the paper information comparing means 33 (at step 1205).

In addition, the CPU 26 uses the paper information comparing means 33 to obtain "the paper information of the page P1 printed immediately before" (the paper information A) to be stored in the NVRAM 53 using the paper information storing means 30.

Then, the CPU 26 uses the paper information comparing means 33 to compare the paper information B (the paper information of the page P2 to be printed next) with the paper information A (the paper information of the page P1 printed immediately before) stored in the NVRAM 53 to judge coincidence therebetween (at step 1206).

Furthermore, even in the case that it is judged at step 1202 that the printing apparatus 20*b* is in the middle of printing (YES at step 1202), the CPU 26 carries out the process of step 1205 to obtain the paper information B and then carries out the process of step 1206.

In the case that "the paper information A is initialized" or "the content of the paper information A is the same as the content of the paper information B" as the result of the comparison between the paper information A and the paper information B obtained by the CPU 26 (YES at step 1206), the printing of the page P2 is carried out (at step 1207).

Then, when the printing of one page of the image data is completed successfully at step 1207, the paper information of the printed page, i.e., the paper information (the paper information B) compared in advance using the paper information comparing means 33, is stored in the NVRAM 53 as "the paper information of the page printed immediately before" using the paper information storing means 30 (at step 1208).

Furthermore, in the case that "the paper information A is not initialized" and "the content of the paper information A is not the same as the content of the paper information B" as the result of the comparison at step 1206 (NO at step 1206), the printing apparatus 20*b* temporarily stops the printing and displays a message prompting the user to carry out paper replacement on the operation panel 22 (at step 1210).

According to the message displayed on the operation panel 22, the user replaces the paper stored in the paper feed tray with the paper having the paper size of the page to be printed next.

After the paper replacement at the paper feed tray is completed, the user inputs a print restart instruction to the printing apparatus 20b through the operation panel 22.

Upon receiving the print restart instruction from the user who has completed the paper replacement (YES at step 1211), the printing apparatus 20b prints the image data of one page (at step 1207).

Then, when the printing of the image data of one page is completed normally, the paper information of the page printed normally is stored in the NVRAM 53 as "the paper information of the page printed immediately before (the paper information A)" (at step 1208).

In the case that the printing of the image data of one page is carried out but the print job is not yet completed (NO at step 1209), the paper size of the page to be printed next (the paper information B) is obtained using the paper information comparing means 33 (at step 1205).

Then, "the paper information of the page printed immediately before" (the paper information A) stored in the NVRAM 53 is compared with the paper information B of the page to be printed next using the paper information comparing means 33 (at step 1206).

Moreover, in the case that the printing of the image data of one page is carried out and the print job is completed (YES at step 1209), the receiving means 34 is set in a state of waiting for the reception of a print job (NO at step 1203 and NO at step 1202).

In the case that the power of the printing apparatus 20b is turned from off to on, the processing is carried out according to the content of the setting of the DIP switch.

However, in the case that "the timing of the automatic initialization" is set on the paper information initialization timing setting display 301 while the power of the printing apparatus 20b is turned on, the processing starts from step 1202.

Figure 12:
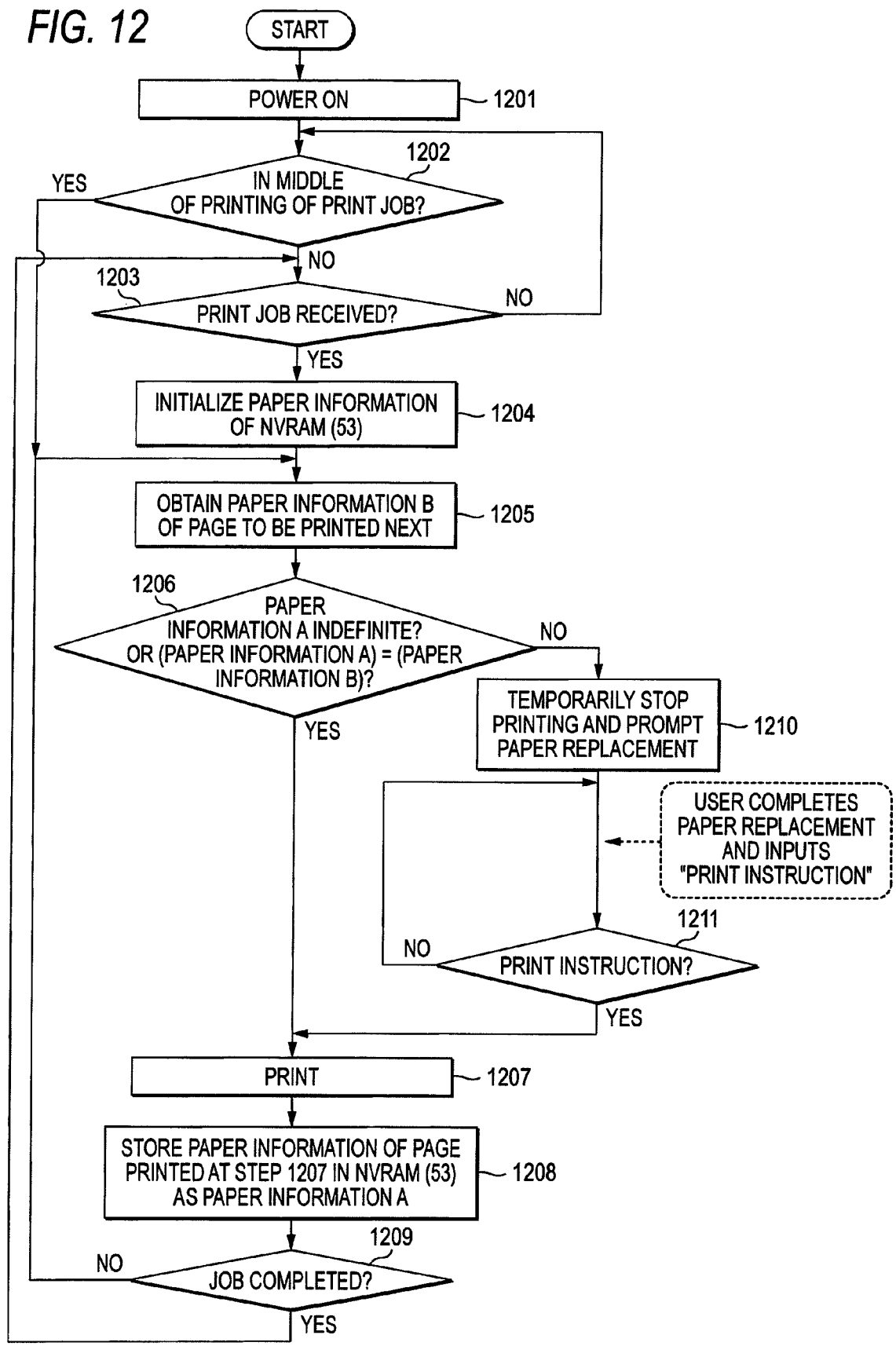
FIG. 12 is a flowchart showing processing carried out by a printing apparatus 20b.

Furthermore, in the case that "the timing of the automatic initialization" is set at "before the start of the printing of a print job" on the paper information initialization timing setting display 301 while the power of the printing apparatus 20b is turned on, the printing apparatus 20b carries out the processing beginning with step 1204 described referring to FIG. 12, that is, the initialization of the paper information of the NVRAM 53. The subsequent processing is the same as that described referring to FIG. 12.

The following will describe how a specific job is carried out in the printing apparatus 20b configured as described above, referring to FIG. 13.

Figure 13:
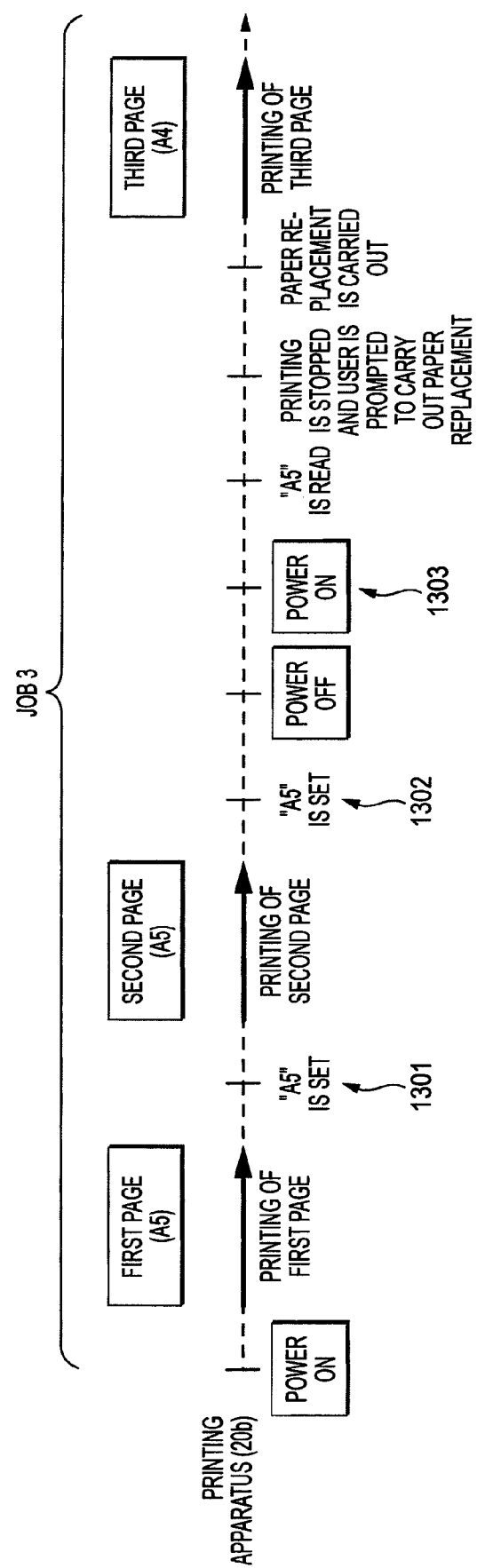
FIG. 13 is a view showing processing for printing job 3 in the printing apparatus 20b.

FIG. 13 is a schematic view showing how job 3 is carried out by the printing apparatus 20b, wherein the job 3 includes a first page of size A4, a second page of size A5 and a third page of size A4.

When the power of the printing apparatus 20b is turned on and the first page of the job 3 is printed, "A4" is stored in the paper information storing means 30 (reference NO. 1301).

Next, when the second page of the job 3 is printed in the printing apparatus 20b, "A5" is stored in the paper information storing means 30 (reference NO. 1302).

After "A5" of the second page of the job 3 is stored in the paper information storing means 30 of the printing apparatus 20b, the power of the printing apparatus 20b is turned off, and then the power of the printing apparatus 20b is turned on (reference NO. 1303).

After the power is turned on (reference NO. 1303), the printing apparatus 20b going to print the third page of the job 3 obtains "A4" as the paper size (the paper information B) of the third page to be printed next (at step 1205 of FIG. 12), reads "A5" serving as "the paper information of the page printed immediately before" as the paper information A, and compares the paper information B with the paper information A (at step 1206 of FIG. 12).

Since the paper information B ("A4") is different from the paper information A ("A5") as the result of the comparison (No at step 1206 of FIG. 12), the printing apparatus 20b temporarily stops the printing and displays a message prompting the user to carry out paper replacement on the operation panel 22 (at step 1210 of FIG. 12).

After the paper replacement is completed, the user inputs a print restart instruction to the printing apparatus 20b.

Upon receiving the print restart instruction, the printing apparatus 20b prints the third page of the job 3 on A4 size paper.

As described above, the printing apparatus 20b in which the controller 21 of the printing apparatus 20 described in the first exemplary embodiment is further equipped with the NVRAM 53 carries out printing while the paper information A is stored in the NVRAM 53 serving as a non-volatile memory.

Hence, in the case that the paper size of the page to be printed is changed in the middle of the job (from "A5" of the second page to "A4" of the third page of the job 3 described above) and even if the power of the printing apparatus 20b is turned on and off before the change, the paper information A stored in the NVRAM 53 is used and a process of prompting the user to carry out paper replacement is performed, but the printing apparatus 20b initializes the paper information of the NVRAM 53 before starting the printing of a print job to be received newly (at step 1205 of FIG. 12). As a result, it is possible to obtain an effect similar to that obtained in the printing apparatus 20. (The effect is such that in the case that the paper size of the page printed immediately before is different from the paper size of the first page of the print job to be instructed from the PC 10 so as to be printed, when the user replaces the paper of the paper feed tray before issuing the print instruction and then the user issues the print instruction, the printing based on the print instruction is carried out by the printing apparatus 20b without the printing by the printing apparatus 20b being stopped temporarily.)

In the printing apparatus 20b, the timing at which "the paper information of the page printed immediately before" stored using the paper information storing means 30 is automatically initialized may be set at "after the end of the printing of a print job" or "before the start of the printing of a print job" or "after the end of the printing of all the print jobs stored in a queue" or "before the start of the printing of the print jobs stored in a queue beginning with 0." As a result, it is possible to obtain an effect similar to that obtained in the printing apparatus 20 in correspondence with the respective timings (the same effect as in the printing apparatus 20 in which the timing of the automatic initialization is set at the respective timings as described in the first exemplary embodiment).

The printing apparatus 20b may be a multifunctional machine having not only the function of printing print data transmitted from the PC 10 but also a copying function, a facsimile function, etc.

The printing apparatus 20b may have a plurality of paper feed trays, and the plurality of paper feed trays may have a common paper presence sensor. This is because in the case that the plurality of paper feed trays have a common paper presence sensor and, for example, in a state in which one of the paper feed trays has been loaded with paper and the other paper feed tray is newly loaded with paper, the paper loaded in the other paper feed tray is not detected. Hence, the replacement of the paper may not be substantially detected in some cases.

In the printing apparatus 20b, in the case that "the timing at which the paper information is automatically initialized" is selected on the paper information initialization timing setting display 301 of the printing apparatus from the state in which "the paper information is not automatically initialized," the paper information of the NVRAM 53 is initialized after "the timing at which the paper information is automatically initialized" is selected, and then various printing processes are carried out.

The image forming program according to the present invention may be provided through communication means as a matter of course or may also be recorded on recording media, such as CD-ROMs, and provided with such recording media.

Exemplary Embodiment 4

In a fourth exemplary embodiment, the paper information stored in the RAM 25 is not "the paper information of the page printed immediately before (the paper information A)" in the printing apparatus 20 described in the first exemplary embodiment but "the paper information of the first page of the print job printed immediately before (paper information C)."

Components having the same reference numbers as those described in the first exemplary embodiment have the same functions and their descriptions are omitted in the fourth exemplary embodiment. However, in the case that new contents are described in the fourth exemplary embodiment, the contents to be described in the fourth exemplary embodiment have higher priority than the contents described in the first exemplary embodiment.

In addition, the meanings of the words and phrases used in the fourth exemplary embodiment are basically the same as those used in the first exemplary embodiment. However, in the case that the words and phrases used in the fourth exemplary embodiment have new meanings, the meanings of the words and phrases used in the fourth exemplary embodiment have higher priority than those used in the first exemplary embodiment.

In the printing apparatus 20, the processing of the printing apparatus 20 in the case that the timing at which the paper information is automatically initialized is set at "after the end of the printing of a print job" will be described below referring to FIG. 14.

The paper information of the first page of the print job printed immediately before is stored as the paper information C in the RAM 25 of the printing apparatus 20.

When the print job is printed normally, the paper size of the first printed page of the print job is stored as the paper information C in the RAM 25 using the paper information storing means 30.

The paper information C stored using the paper information storing means 30 is updated each time the printing of a print job is completed.

The paper information clearing means 31 initializes the paper information C stored using the paper information storing means 30. More specifically, the paper information clearing means 31 stores number "0" instead of a number (for example, "1" in the case of A4) corresponding to a specific paper size at a location of the RAM 25 in which "the paper information of the first page of the print job printed immediately before" is stored.

Under the control of the CPU 26, the paper information comparing means 33 carries out the function of comparing "the paper information of the first page of the print job printed immediately before (the paper information C)" stored using the paper information storing means 30 with "the paper information of the page to be printed next (the paper information B)" to judge coincidence therebetween.

Figure 14:
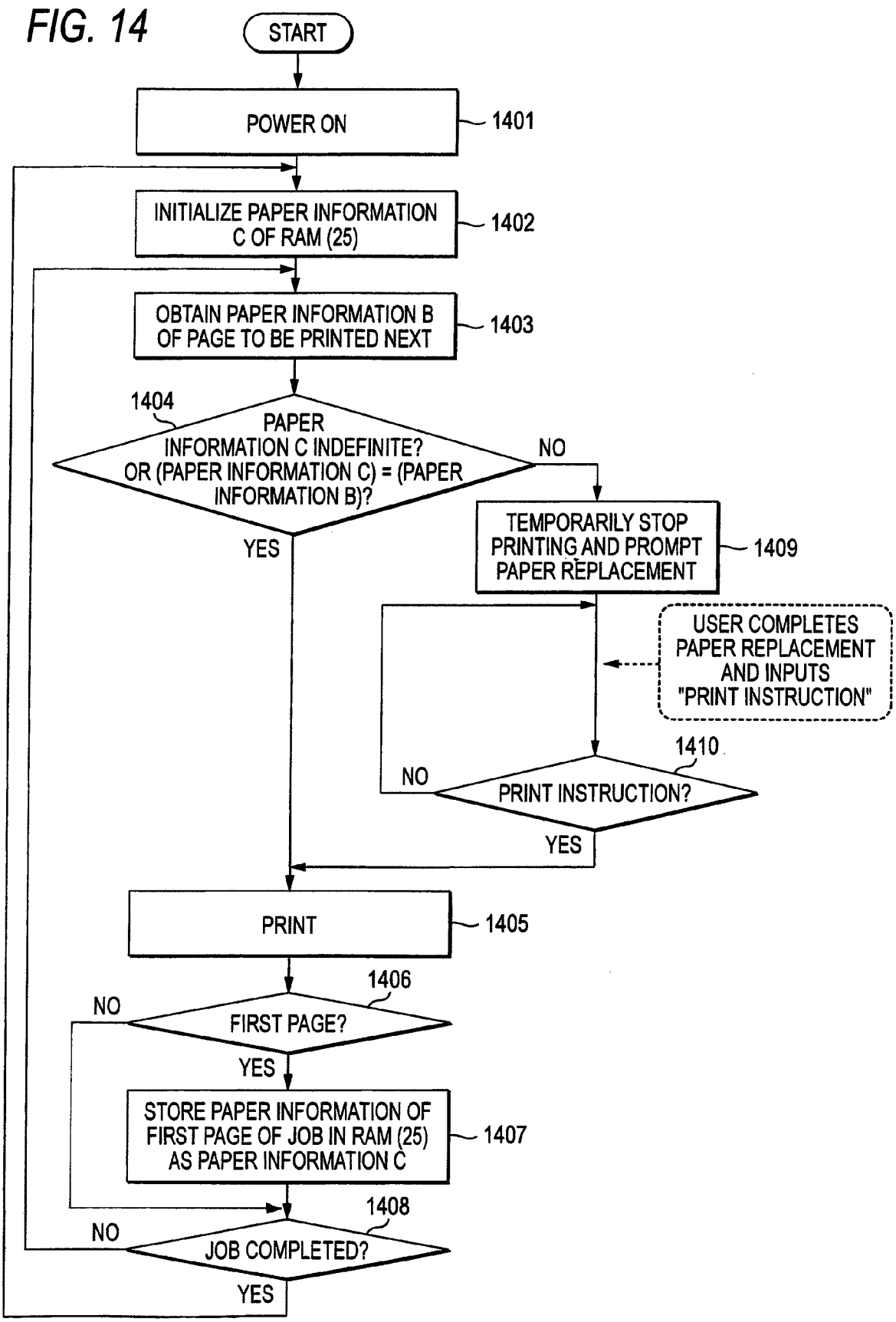
FIG. 14 is a flowchart showing processing for comparing "the paper information of the first page of a print job printed immediately before" with the paper information preset in image data to be printed next.

FIG. 14 is a flowchart showing the processing carried out by the printing apparatus 20 in the case that the timing at which the paper information is automatically initialized is set at "after the end of the printing of a print job and that the paper information C is stored in the RAM 25."

The content described referring to FIG. 14 corresponds to the case in which "the timing at which the paper information is automatically initialized" is set through the DIP switch. However, in the case that "the timing at which the paper information is automatically initialized" is set at "after the end of the printing of a print job" on the paper information initialization timing setting display 301 described in the first exemplary embodiment while the power of the printing apparatus 20 is turned on, the processing starts in the middle of the flowchart shown in FIG. 14 as described later in detail.

When the power of the printing apparatus 20 is turned from off to on (at step 1401), the paper information of the RAM 25 of the printing apparatus 20 is initialized (at step 1402).

When the paper information of the RAM 25 is initialized, the indefinite information "0" is stored as the paper information C (the paper information of the first page of the print job printed immediately before) to be stored in the RAM 25.

In the printing apparatus 20, the receiving means 34 receives a print job, and the printing means 32 generates image data by analyzing the print job.

When the page of the image data to be printed using the printing means 32 is determined, the CPU 26 obtains the paper information of the page P2 to be printed next (the paper information B) using the paper information comparing means 33 (at step 1403).

In addition, the CPU 26 uses the paper information comparing means 33 to obtain "the paper information of the first page of the print job printed immediately before (the paper information C)" to be stored in the RAM 25 using the paper information storing means 30.

Then, the CPU 26 uses the paper information comparing means 33 to compare the paper information B (the paper information of the page P2 to be printed next) with the paper information C (the paper information of the first page of the print job printed immediately before) to judge coincidence therebetween (at step 1404).

In the case that "the paper information C is initialized" or "the content of the paper information C is the same as the content of the paper information B" as the result of the comparison between the paper information B and the paper information C obtained by the CPU 26 (YES at step 1404), the printing of the page P2 is carried out (at step 1405).

In the case that the printed page is the first page of the print job (YES at step 1406), the paper information of the printed page P2 is stored in the RAM 25 as the paper information C (at step 1407).

In the case that the content of the paper information B is not the same as the content of the paper information C at step 1404 (NO at step 1404), the printing apparatus 20 temporarily stops the printing and displays a message prompting the user to carry out paper replacement on the operation panel 22 (at step 1409).

After completing the paper replacement at the paper feed tray, the user inputs a print restart instruction to the printing apparatus 20 through the operation panel 22.

Upon receiving the print restart instruction from the user who has completed the paper replacement (YES at step 1410), the printing apparatus 20 prints the image data of one page (at step 1405).

In the case that the print job is not completed thereafter (NO at step 1408), the CPU 26 obtains the paper information of the page P3 to be printed next (the paper information B) using the paper information comparing means 33 (at step 1403).

Then, the CPU 26 uses the paper information comparing means 33 to obtain the paper information C to be stored in the RAM 25 using the paper information storing means 30. Since the paper information C obtained at this time is the paper information C obtained after the printing of the first page of the print job is completed, the paper information C becomes the paper information of the first page of the print job being in the middle of printing.

In other words, in the case that the paper information C is obtained in the middle of the printing of the print job after the printing of the first page is completed, the paper information C becomes the paper information of the first page of the print job being in the middle of printing. In the other cases, the paper information C becomes the paper information of the first page of the print job printed immediately before.

Then, the CPU 26 uses the paper information comparing means 33 to compare the paper information B (the paper information of the page P3 to be printed next) with the paper information C (in this case, the paper information of the first page of the print job being in the middle of printing since the printing of the first page is completed) to judge coincidence therebetween (at step 1404).

In the case that "the content of the paper information C is the same as the content of the paper information B" as the result of the comparison between the paper information B and the paper information C obtained by the CPU 26 (YES at step 1404), the printing of the page P3 is carried out (at step 1405).

In the case that that the printed page is not the first page of the print job (NO at step 1406) when the printing is carried out at step 1405, a judgment is made at step 1408 as to whether the print job is completed (at step 1408).

When it is judged that the print job is completed (YES at step 1408), the process of initializing the paper information C stored in the RAM 25 is carried out using the paper information clearing means 31 (at step 1402).

As described above, the printing apparatus 20 may store the paper information of the first page of the print job as the paper information C and process the paper information.

The printing apparatus 20 may be a multifunctional machine having not only the function of printing print data transmitted from the PC 10 but also a copying function, a facsimile function, etc.

The printing apparatus 20 may have a plurality of paper feed trays, and the plurality of paper feed trays may have a common paper presence sensor. This is because in the case that the plurality of paper feed trays have a common paper presence sensor and, for example, in a state in which one of the paper feed trays has been loaded with paper and the other paper feed tray is newly loaded with paper, the paper loaded in the other paper feed tray is not detected. Hence, the replacement of the paper may not be substantially detected in some cases.

In the printing apparatus 20, in the case that "the timing at which the paper information is automatically initialized" is selected on the paper information initialization timing setting display 301 of the printing apparatus from the state in which "the paper information is not automatically initialized," the paper information of the RAM 25 is initialized after "the timing at which the paper information is automatically initialized" is selected, and then various printing processes are carried out.

The image forming program according to the present invention may be provided through communication means as a matter of course or may also be recorded on recording media, such as CD-ROMs, and provided with such recording media.

The present invention is applicable to image forming apparatuses, image forming systems and image forming programs.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

1 printing system
20, 20*a*, 20*b* printing apparatus
controller
22 operation panel
25 RAM
26 CPU
30 paper information storing means
31 paper information clearing means
33 paper information comparing means
51 paper feed tray with paper presence sensor
52 NVRAM
301 paper information initialization timing setting display

What is claimed is:

1. An image forming apparatus comprising:
    a receiving unit that receives print jobs;
    a paper information storing unit that, when the received print jobs are executed according to a given order and each time one page of a document in a print job having reached its turn in the order of printing is printed, stores paper information preset in the printed page;
    an initializing unit that initializes the paper information stored in the paper information storing unit during a period between the printing of the print job having reached its turn in the given order and the printing of the next print job after the print job in the given order;
    a paper information comparing unit that compares the paper information of the page to be printed in the print job having reached its turn in the order of printing with the paper information stored in the paper information storing unit;
    a temporary stopping unit that temporarily stops printing in the case that the paper information of the page to be printed is different from the paper information stored in the paper information storing unit as the result of the comparison; and
    a printing unit that prints the print data of the page to be printed in the case that the paper information of the page to be printed is the same as the paper information stored in the paper information storing unit as the result of the comparison or the paper information stored in the paper information storing unit has been initialized,
    wherein:
        the initializing unit initializes the paper information after each of the print jobs ends;
        the paper information comparing unit compares the paper information to be printed next with the paper information printed immediately before;

in response to the paper information of the page to be printed being the same as the paper information stored in the paper information storing unit as the result of the comparison, the printing unit prints the print data of the page to be printed without an instruction from a user;

in response to the paper information stored in the paper information storing unit being initialized, the printing unit prints the print data of the page to be printed without the instruction from the user; and in response to the paper information of the page to be printed not being the same as the paper information stored in the paper information storing unit as the result of the comparison the paper information stored in the paper information storing unit not being initialized, the image forming apparatus temporarily stops the printing and displays a message prompting the user to carry out paper replacement on an operation panel.

2. The image forming apparatus according to claim 1, wherein the paper information stored in the paper information storing unit indicates a paper size of a paper on which the printing of the printed page is done, and the paper information of the page to be printed that is compared by using the paper information comparing unit is the paper size of the paper to be printed on which the page to be printed is printed.

3. The image forming apparatus according to claim 1, wherein the paper information of the printed page is initialized after the printing of the print job having reached its turn in the given order is completed.

4. The image forming apparatus according to claim 1, wherein the initializing unit initializes the paper information of the printed page before the start of the printing of the print job having reached its turn in the given order.

5. The image forming apparatus according to claim 1, wherein the initializing unit initializes the paper information of the printed page after all the print jobs received using the receiving unit and waiting for printing are printed.

6. The image forming apparatus according to claim 1, wherein the initializing unit initializes the paper information of the printed page before the start of the printing of the print jobs that are received using the receiving unit after a state in which there are no print jobs waiting for printing.

7. The image forming apparatus according to claim 1, wherein the temporary stopping unit temporarily stops the printing and displays a message prompting the user to carry out paper replacement on a display section.

8. The image forming apparatus according to claim 1 further comprising a paper presence detecting unit that detects a presence of paper stored in a paper feed tray, wherein when the replacement of paper stored in the paper feed tray is detected by the paper presence detecting unit, the printing stopped by using the temporary stopping unit is resumed.

9. The image forming apparatus according to claim 1, wherein the paper information storing unit is rewritable and non-volatile.

10. The image forming apparatus according to claim 1 further comprising a selecting unit that selects a state in which the initializing unit is activated or a state in which the initializing unit is inactivated, wherein in the case that the state in which the initializing unit is inactivated is selected, processing is carried out without activating the initializing unit, and in the case that the state in which the initializing unit is activated is selected using the selecting unit from the state in which the initializing unit is inactivated, the paper information of the printed page stored in the paper information storing unit is initialized using the initializing unit after the state in which the initializing unit is activated is selected.

11. An image forming system comprising:

a print instruction terminal that sends print jobs; and an image forming apparatus that execute the print jobs and includes:

a receiving unit that receives the print jobs;

a paper information storing unit that, when the received print jobs are executed according to a given order and each time one page of a document in a print job having reached its turn in the order of printing is printed, stores paper information preset in the printed page;

an initializing unit that initializes the paper information stored in the paper information storing unit during a period between the printing of the print job having reached its turn in the given order and the printing of the next print job after the print job in the given order;

a paper information comparing unit that compares the paper information of the page to be printed in the print job having reached its turn in the order of printing with the paper information stored in the paper information storing unit;

a temporary stopping unit that temporarily stops printing in the case that the paper information of the page to be printed is different from the paper information stored in the paper information storing unit as the result of the comparison; and a printing unit that prints the print data of the page to be printed in the case that the paper information of the page to be printed is the same as the paper information stored in the paper information storing unit as the result of the comparison or the paper information stored in the paper information storing unit has been initialized, wherein:

the initializing unit initializes the paper information after each of the print jobs ends;

the paper information comparing unit compares the paper information to be printed next with the paper information printed immediately before;

in response to the paper information of the page to be printed being the same as the paper information stored in the paper information storing unit as the result of the comparison, the printing unit prints the print data of the page to be printed without an instruction from a user;

in response to the paper information stored in the paper information storing unit being initialized, the printing unit prints the print data of the page to be printed without the instruction from the user; and in response to the paper information of the page to be printed not being the same as the paper information stored in the paper information storing unit as the result of the comparison and the paper information stored in the paper information storing unit not being initialized, the image forming apparatus temporarily stops the printing and displays a message prompting the user to carry out over replacement on an operation panel.

12. A non-transitory computer readable medium storing a program causing a computer to execute a process for image forming, the process comprising:

receiving print jobs;

when the received print jobs are executed according to a given order and each time one page of a document in a print job having reached its turn in the order of printing is printed, storing paper information preset in the printed page;

initializing the paper information during a period between the printing of the print job having reached its turn in the given order and the printing of the next print job after the print job in the given order;

comparing the paper information of the page to be printed in the print job having reached its turn in the order of printing with the stored paper information;

temporarily stopping printing in the case that the paper information of the page to be printed is different from the stored paper information as the result of the comparison; and printing the print data of the page to be printed in the case that the paper information of the page to be printed is the same as the stored paper information as the result of the comparison or the stored paper information has been initialized, wherein:

the paper information is initialized after each of the print jobs ends;

the paper information to be printed next is compared with the paper information printed immediately before;

in response to the paper information of the page to be printed being the same as the stored paper information as the result of the comparison, printing the print data of the page to be printed without an instruction from a user;

in response to the stored paper information being initialized, printing the print data of the page to be printed without the instruction from the user; and in response to the paper information of the page to be printed not being the same as the stored paper information as the result of the comparison and the stored paper information not being initialized, temporarily stopping the printing and displaying a message prompting the user to carry out paper replacement on an operation panel.

* * * * *